(12) United States Patent
Fujii

(10) Patent No.: US 7,766,746 B2
(45) Date of Patent: Aug. 3, 2010

(54) GAME APPARATUS AND GAME PROGRAM

(75) Inventor: Takaya Fujii, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 809 days.

(21) Appl. No.: 10/988,635

(22) Filed: Nov. 16, 2004

(65) Prior Publication Data

US 2005/0170887 A1 Aug. 4, 2005

(30) Foreign Application Priority Data

Jan. 29, 2004 (JP) ............................. 2004-021998

(51) Int. Cl.
*A63F 13/00* (2006.01)
(52) U.S. Cl. .......................................... 463/31; 463/40
(58) Field of Classification Search .................. 463/31, 463/40–42; 273/138.1, 143 R; 434/169
See application file for complete search history.

(56) References Cited

U.S. PATENT DOCUMENTS 5,411,270 A * 5/1995 Naka et al. .................... 463/33

2003/0190940 A1* 10/2003 Gordon et al. ................ 463/9
2005/0176502 A1*  8/2005 Nishimura et al. ............ 463/31

FOREIGN PATENT DOCUMENTS

| JP | 58-116377 | | 7/1983 |
|---|---|---|---|
| JP | 11-319323 | | 11/1999 |
| JP | 2001-70647 | | 3/2001 |
| JP | 2001-070647 | * | 3/2001 |
| JP | 2002-000939 | | 1/2002 |

OTHER PUBLICATIONS

Office Action issued Mar. 25, 2008 in corresponding JP Application No. 2004-021998.

* cited by examiner

*Primary Examiner*—Peter DungBa Vo
*Assistant Examiner*—Masud Ahmed
(74) *Attorney, Agent, or Firm*—Nixon & Vanderhye P.C.

(57) ABSTRACT

The game apparatus comprises a first LCD 11 for displaying a first game image, a second LCD 12 for displaying a second game image relating to the first game image, character display control means for displaying a player character 80 on at least one of the first LCD 11 and the second LCD 12, and character ability changing means for changing the ability of the player character 80 depending on whether the player character 80 is displayed on the first LCD 11 or the second LCD 12. With the above-described game apparatus having two display sections, it is possible to realize amore novel and interesting game.

14 Claims, 17 Drawing Sheets

FIG. 9

| OUTLINE OF GAME EXAMPLE 1 | STRIVE TO REACH GOAL POINT, OVERCOMING WALL AND PASSING THROUGH PLACE OF EXTREME COLD, FOR EXAMPLE |
|---|---|
| SPECIFIC OPERATION | (1) JUMP |
| | (2) ENTER PLACE OF EXTREME COLD |
| FIRST ABILITY INFORMATION | CHARACTER ABILITY VALUE (JUMPING ABILITY 5 COLD RESISTANCE VALUE 80 PHYSICAL STRENGTH 50) |
| SECOND ABILITY INFORMATION | CHARACTER ABILITY VALUE (JUMPING ABILITY 10 COLD RESISTANCE VALUE 20 PHYSICAL STRENGTH 50) |
| MOVEMENT RESULT A | (1) FAIL TO OVERCOME WALL<br>(2) PHYSICAL STRENGTH IS NOT REDUCED |
| MOVEMENT RESULT B | |
| MOVEMENT RESULT C | (1) SUCCEED IN OVERCOMING WALL<br>(2) PHYSICAL STRENGTH IS DECREMENTED BY 30 PER PREDETERMINED TIME |
| MOVEMENT RESULT D | |

FIG. 10A
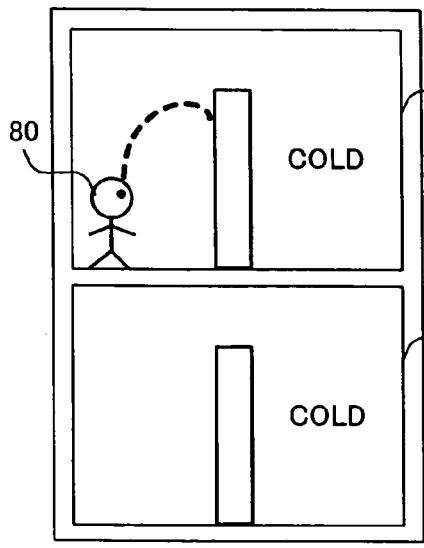

FIG. 10B
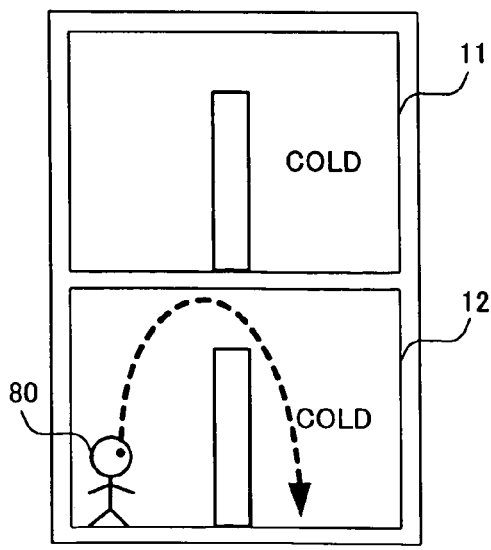

FIG. 11

| OUTLINE OF GAME EXAMPLE 2 | STRIVE TO REACH GOAL POINT BY USING BLOCK AS FOOTHOLD WHILE REPEATING GENERATION AND DESTRUCTION OF BLOCKS |
|---|---|
| SPECIFIC OPERATION | SWING SWORD |
| FIRST ABILITY INFORMATION | ・CAPABLE OF DESTROYING BLOCK<br>・CAPABLE OF ATTACKING ENEMY |
| SECOND ABILITY INFORMATION | ・CAPABLE OF GENERATING BLOCK<br>・TWO BLOCKS CAN BE DISPLAYED (GENERATED) IN SCREEN |
| MOVEMENT RESULT A | ・DESTROY ANY BLOCK IF BLOCK IS LOCATED AT POINT DOWN WHICH SWORD IS SWUNG<br>・ATTACK ANY ENEMY IF ENEMY IS LOCATED AT POINT DOWN WHICH SWORD IS SWUNG |
| MOVEMENT RESULT B | SAME PROCESS AS MOVEMENT RESULT A |
| MOVEMENT RESULT C | ・GENERATE BLOCK AT POINT DOWN WHICH SWORD IS SWUNG<br>・NOT GENERATE ANY BLOCK WITH SWING OF SWORD IF TWO BLOCKS ARE DISPLAYED |
| MOVEMENT RESULT D | SAME PROCESS AS MOVEMENT RESULT C |

FIG. 12

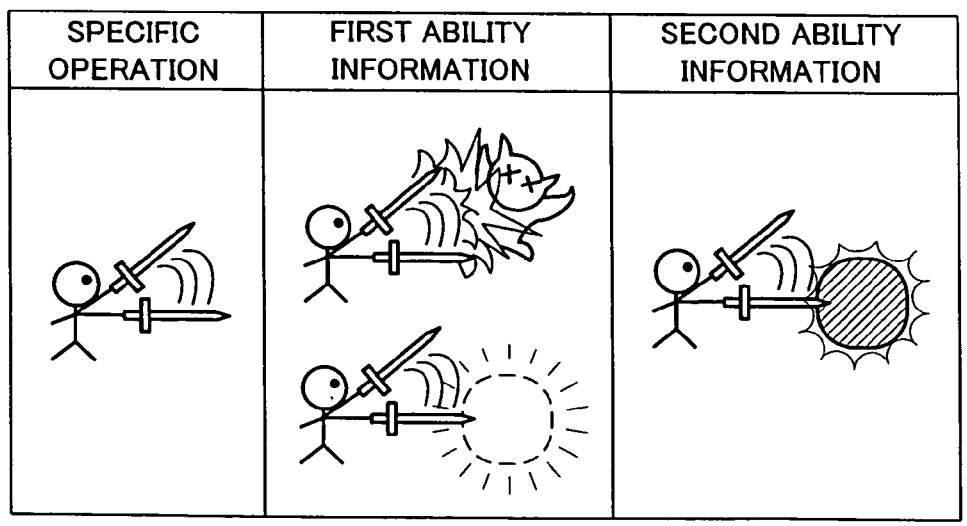

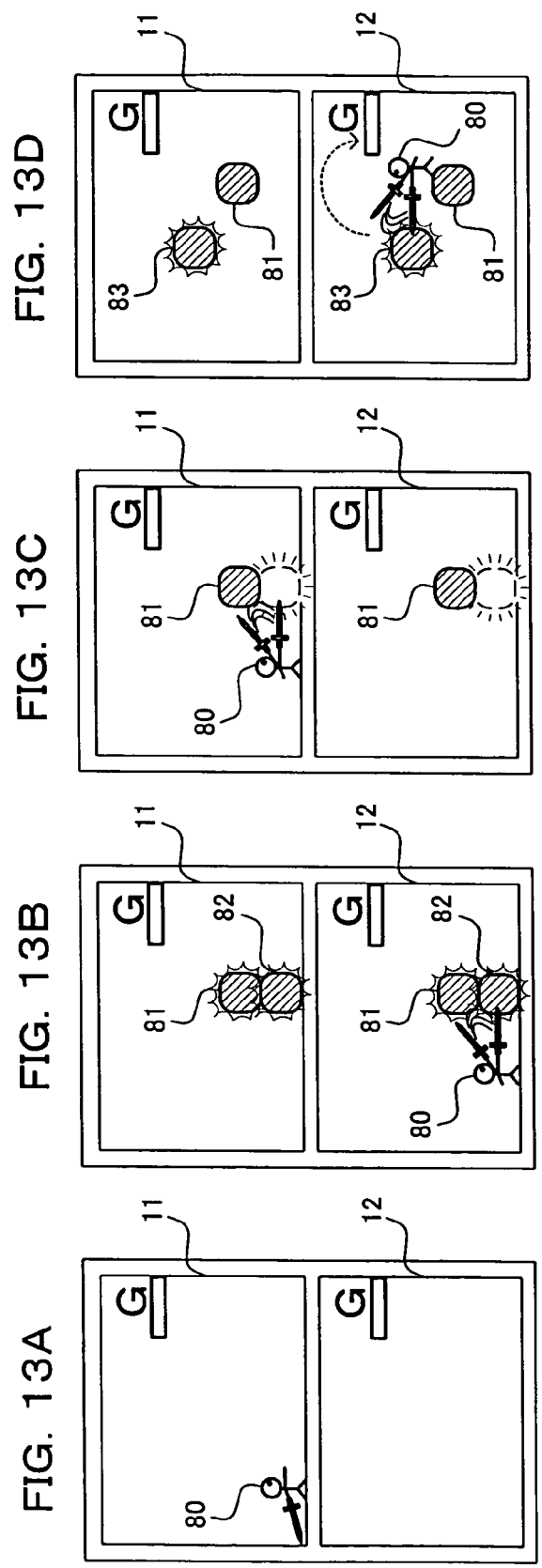

FIG. 14

| OUTLINE OF GAME EXAMPLE 3 | CHANGE DIRECTION OF RIVER TO FLOW OVER SPECIFIC POINT G BY REPEATING GENERATION AND DESTRUCTION OF BANK |
|---|---|
| SPECIFIC OPERATION | INSTRUCT LOCATION AT WHICH BANK SHOULD BE GENERATED (DESTROYED) |
| FIRST ABILITY INFORMATION | CAPABLE OF DESTROYING BANK |
| SECOND ABILITY INFORMATION | CAPABLE OF GENERATING BANK |
| MOVEMENT RESULT A | • DESTROY ANY BANK AT INSTRUCTED LOCATION, THEREBY CHANGING FLOW OF RIVER |
| MOVEMENT RESULT B | SAME PROCESS AS MOVEMENT RESULT A |
| MOVEMENT RESULT C | • GENERATE BANK AT INSTRUCTED LOCATION, THEREBY CHANGING FLOW OF RIVER |
| MOVEMENT RESULT D | SAME PROCESS AS MOVEMENT RESULT C |

FIG. 16

| OUTLINE OF GAME EXAMPLE 4 | ACQUIRE ITEM (TREASURE BOX) BY UTILIZING FACT THAT ONE MOVEMENT RESULT IN ONE MAP HAS INFLUENCE ON ANOTHER MAP |
|---|---|
| SPECIFIC OPERATION | PUNCH |
| FIRST ABILITY INFORMATION | CAPABLE OF DESTROYING WATER TANK |
| SECOND ABILITY INFORMATION | |
| MOVEMENT RESULT A | WATER IN WATER TANK IS SPILLED |
| MOVEMENT RESULT B | FIRE IS EXTINGUISHED |
| MOVEMENT RESULT C | |
| MOVEMENT RESULT D | |

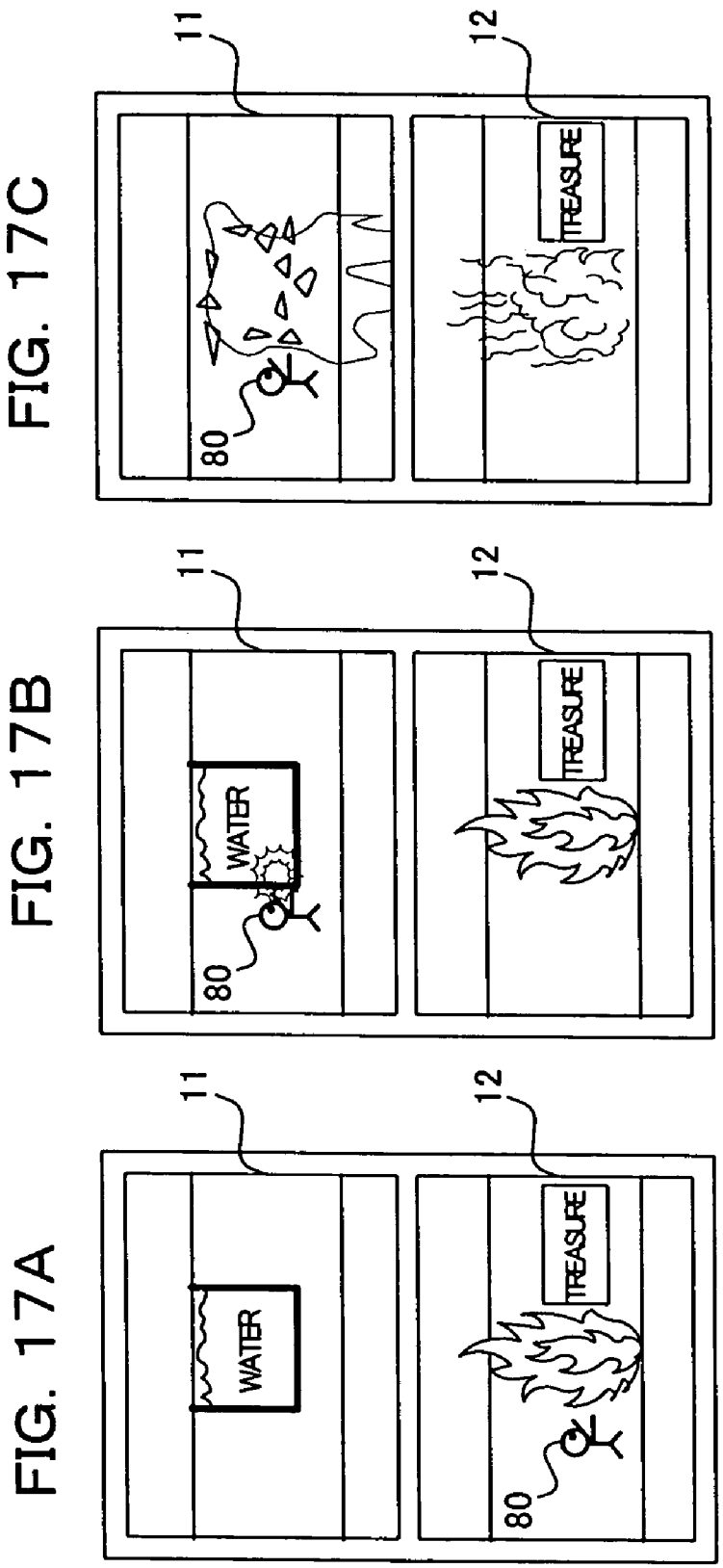

FIG. 20
| | CONDITIONS | EXAMPLES OF SCREEN DISPLAY |
|---|---|---|
| CONDITION 1 | EACH TIME PREDETERMINED TIME HAS ELAPSED | 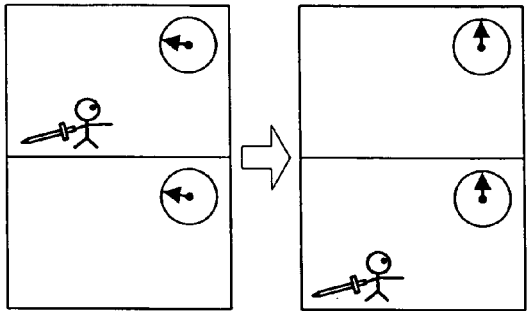 |
| CONDITION 2 | IF CHARACTER STAYS SPECIFIC POINT FOR PREDETERMINED PERIOD OF TIME | 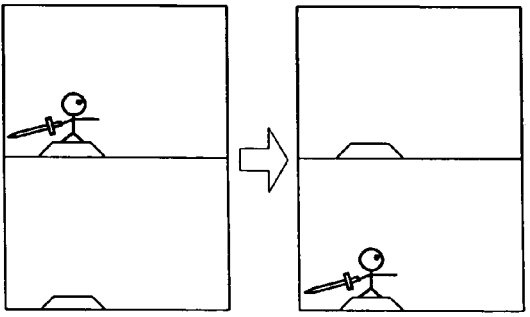 |
| CONDITION 3 | WHEN SPECIFIC ITEM (TOOL) IS USED | 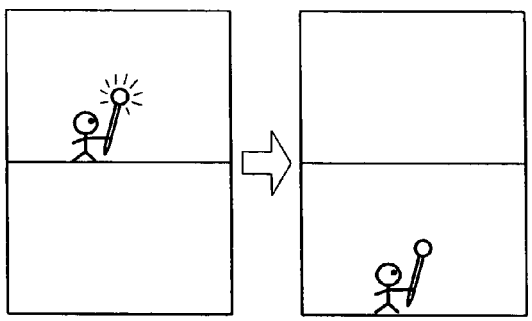 |
| CONDITION 4 | WHEN METER COUNTING NUMBER OF DEFEATED ENEMIES REACHES ITS MAXIMUM | 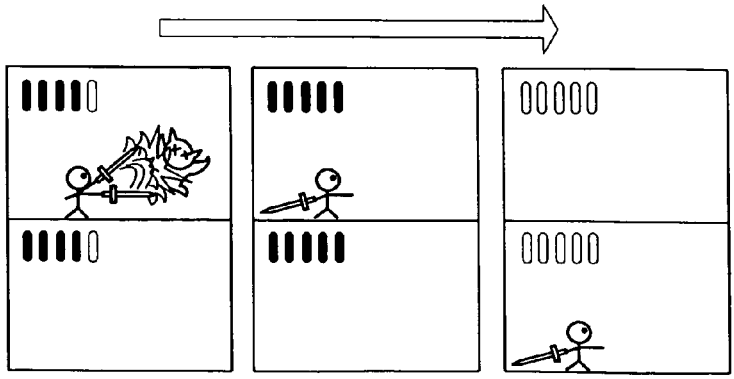 |

GAME APPARATUS AND GAME PROGRAM

This application claims priority to Japanese Patent Application No. JP-2004-021998, filed Jan. 29, 2004, the entire contents of which is incorporated herein by reference.

BACKGROUND OF THE INVENTION

1. Field of the Invention

The illustrative embodiments relate to a game apparatus and a game program. More particularly, the illustrative embodiments relate to a game apparatus and a game program with which a game is played by using two display sections, for example.

2. Description of the Background Art

Japanese Laid-Open Patent Publication No. 58-116377 (hereinafter, referred to as patent document 1) discloses a portable game apparatus provided with an upper screen for fixedly displaying an external appearance of a three-story building and a lower screen for fixedly displaying an interior of the three-story building, such that a character and a drop of oil are displayed therein with segments.

Also, Japanese Laid-Open Patent Publication No. 2001-70647 (hereinafter, referred to as patent document 2) discloses a game apparatus with which each character is able to change his/her position in a versus shooting game in which a character and his/her opponent are positioned in each part of a screen split in two.

In the game apparatus disclosed in patent document 1, background images to be displayed on the upper and lower screens are fixedly displayed, and a moving character and a falling drop of oil are displayed with segments. Thus, a game performed by the above game apparatus is monotonous, only controlling a display position of a character in one or more display panels by operating an operation section. The above game apparatus does not change the ability of a character depending on which screen (upper or lower screen) the character is displayed, nor display the movement result relating to a screen on which a player character is displayed and a screen on which the player character is not displayed.

Also, the game apparatus disclosed in patent document 2 makes a game condition equal by changing a position of each character. However, the above game apparatus does not change the ability of the player character depending on which screen (upper or lower screen) the player character is displayed by displaying the player character on either the upper screen or on the lower screen, nor display the movement result relating to a screen on which the player character is displayed and a screen on which the player character is not displayed.

SUMMARY OF THE INVENTION

Thus, a feature of the illustrative embodiments is to provide a game apparatus and a game program which are capable of changing the ability of a player character depending on whether the player character is displayed on a first display section or a second display section when a game is performed by using two display sections.

Another feature of the illustrative embodiments is to provide a game apparatus and a game program which are capable of displaying a movement result, in accordance with a player operation on a display section on which a player character is displayed, and displaying a movement result on the other display section, relating to the above movement result, when a game is performed by using two display sections.

The illustrative embodiments have the following aspects to attain the features mentioned above (notes in parentheses indicate exemplary elements which can be found in the embodiments to follow, though such notes are not intended to limit the scope of the invention).

A first aspect of the illustrative embodiments is directed to a game apparatus comprising a first display section (11), a second display section (12), character display control means (31, 52), and character ability changing means (31, 53).

The first display section displays a first game image. The second display section displays a second game image relating to the first game image. The character display control means displays a player character (80) on either the first display section or the second display section. The character ability changing means changes the ability of the player character depending on whether the player character is displayed on the first display section or the second display section.

In a second aspect based on the first aspect, the game apparatus further comprises movement condition determination means (31, 54) for determining whether or not the player character satisfies a condition (FIG. 20), based on which the player character is able to move between the first display section and the second display section. When the movement condition determination means determines that the condition is satisfied, the character display control means performs display control (S21, S22) such that the player character moves between the first display section and the second display section.

In a third aspect based on the first aspect, the character ability changing means sets first ability information indicating the ability of the player character as information associated with the first display section (S32), and sets second ability information, which is different from the first ability information, indicating the ability of the player character as information associated with the second display section (S35).

In a fourth aspect based on the third aspect, the game apparatus further comprises an operation section (15) operated by the player in order to operate the player character, and display section detection means (31, S14) for detecting whether the player character is displayed on the first display section or the second display section. When the display section detection means detects that the player character is displayed on the first display section, movement of the player character is controlled by the character display control means, based on the first ability information, in accordance with the operation of the operation section by the player (S15). Also, when the display section detection means detects that the player character is displayed on the second display section, movement of the player character is controlled by the character display control means, based on the second ability information, in accordance with the operation of the operation section by the player (S17).

In a fifth aspect based on the fourth aspect, the game apparatus further comprises movement result display control means (31, 55), for displaying a movement result on at least one of the first display section and the second display section, when a movement of the player character is controlled by the character display control means. When the player performs a specific operation (e.g., "jump") for the player character using the operation section, the movement result display control means displays, in response to the specific operation, different movement results depending on whether the player character is displayed on the first display section or the second display section.

In a sixth aspect based on the fifth aspect, the movement result display control means displays a first movement result (movement result A) on the first or second display section on which the player character is displayed, and displays a second movement result (movement result B) relating to the first movement result on the other display section.

In a seventh aspect based on the sixth aspect, the first movement result is identical to the second movement result (FIG. 11).

In an eighth aspect based on the fifth aspect, the game apparatus further comprises a touch panel (16), touch panel operation determination means (56), and operation position detection means (57). The touch panel is provided on at least one of the first display section and the second display section. The touch panel operation determination means determines whether or not the touch panel is operated within a predetermined time after a movement of the player character is controlled by the character display control means (S60, S61, S66). The operation position detection means detects an operation position of the touch panel, when the touch panel operation determination means determines that the touch panel is operated (S62). The movement result display control means displays a movement result at a display position of the first display section and/or the second display section, corresponding to the operation position detected by the operation position detection means (S63, S65).

A ninth aspect of the illustrative embodiments is directed to a game apparatus comprising a first display section (11), a second display section (12), character display control means (31, 52), an operation section (15), movement result display control means (31, 55), and movement condition determination means (31, 54).

The first display section displays a first game image. The second display section displays a second game image relating to the first game image. The character display control means displays a player character (80) on either the first display section or the second display section. The operation section is operated by the player in order to operate the player character. The movement result display control means displays a first movement result (e.g., "water in the water tank is spilled") on the first or second display section on which the player character is displayed, based on an operation of the operation section by the player, and displays a second movement result (e.g., "fire is extinguished"), relating to the first movement result, on the other display section (FIG. 17). The movement condition determination means determines whether or not the player character satisfies a condition (FIG. 20), based on which the player character is able to move between the first display section and the second display section (S20). When the movement condition determination means determines that the condition is satisfied, the character display control means performs display control, such that the player character moves between the first display section and the second display section (S21, S22).

In a tenth aspect based on the ninth aspect, the first movement result is different from the second movement result (FIG. 16).

According to the first aspect, the ability of the player character is changed, depending on whether the player character is displayed on the first display section or the second display section. Thus, it is possible to realize a novel and interesting game.

According to the second aspect, when the player character satisfies a movement condition, the player character moves between the first display section and the second display section. Thus, it is possible to realize a strategy-oriented game that requires a player to tactfully use the ability of the player character, by moving the player character between the first display section and the second display section as circumstances demand.

According to the third aspect, it is possible to set ability information of the player character for each display section.

According to the fourth aspect, a movement of the player character is controlled in response to the operation of the player, based on the ability information set for the display section on which the player character is displayed. Thus, it is possible to cause the player character to perform various moves.

According to the fifth aspect, different movement results in accordance with the operation of the player are displayed depending on whether the player character is displayed on the first display section or the second display section. Thus, it is possible to realize an interesting game in which circumstances change incessantly.

According to the sixth, seventh, ninth, and tenth aspects, a movement result in accordance with the operation of the player is displayed on a display section on which the character is displayed, and a relevant movement result is displayed on the other display section on which the character is not displayed. As a result, it is possible to realize a strategy-oriented game in which a movement on one display section has an influence on the other display section.

According to the eighth aspect, the player is free to determine a display position of a movement result, which is displayed in accordance with the operation of the player, by using the touch panel.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is an illustration showing various settings of a game example 1;

FIGS. 10A and 10B are exemplary game screens of the game example 1;

FIG. 11 is an illustration showing various settings of a game example 2;

FIG. 12 is an illustration showing a relation between a specific operation and first ability information, and a relation between the specific operation and second ability information in the game example 2;

FIGS. 13A to 13D are exemplary game screens of the game example 2;

FIG. 14 is an illustration showing various settings of a game example 3;

FIG. 16 is an illustration showing various settings of a game example 4;

FIGS. 17A to 17C are exemplary game screens of the game example 4;

FIG. 20 shows specific examples of conditions based on which a player character 80 moves between a first LCD 11 and a second LCD 12.

DESCRIPTION OF THE PREFERRED EMBODIMENTS

Figure 1:
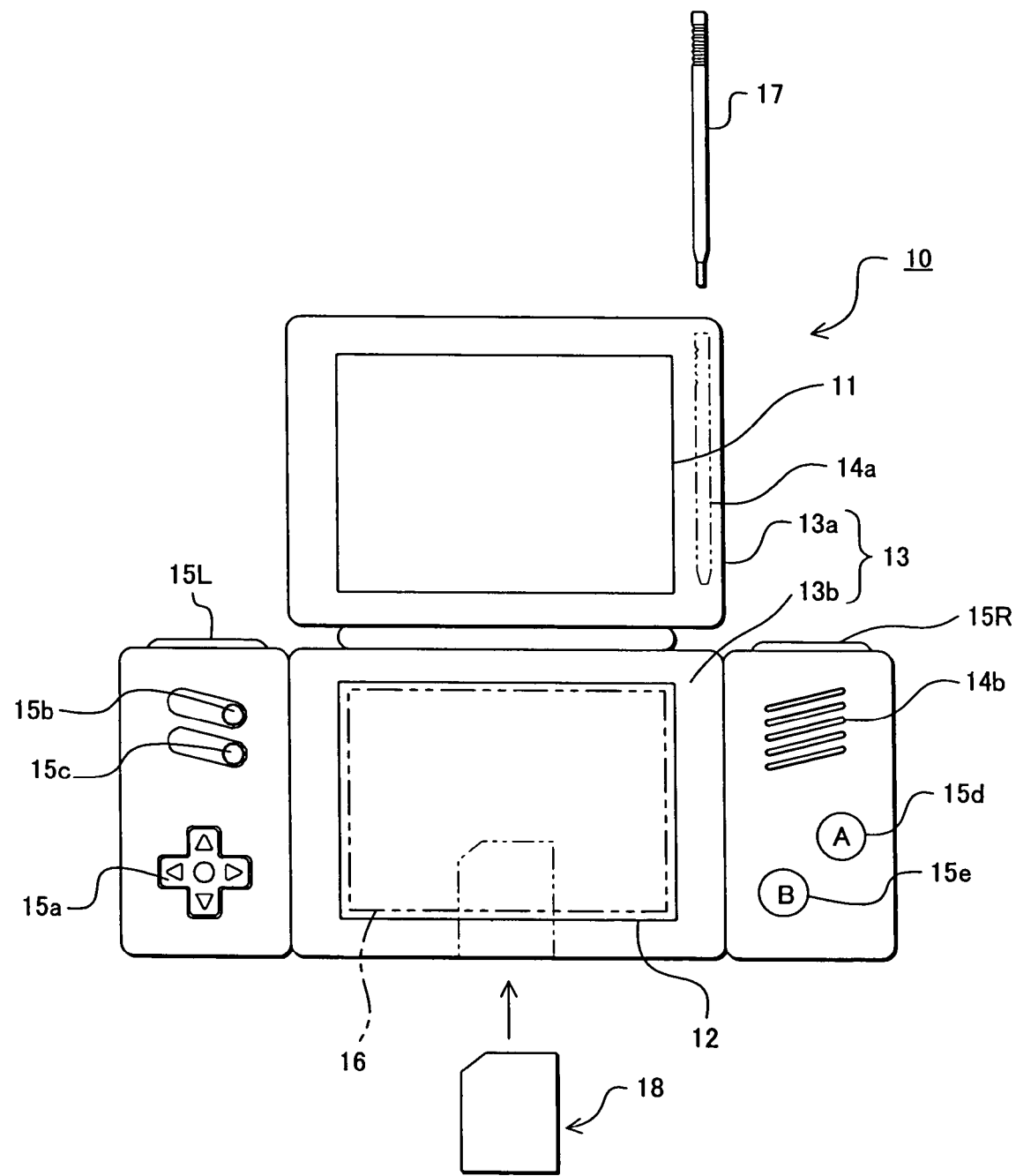
FIG. 1 is an external view of a portable game apparatus that is one example of the illustrative embodiments.

Hereinafter, with reference to the drawing, a portable game apparatus according to one embodiment of the present invention will be described.

FIG. 1 an external view of a portable game apparatus that is one example of the illustrative embodiments. In FIG. 1, a portable game apparatus 10 is structured so that two liquid crystal displays 11 and 12 (hereinafter, referred to as "LCDs") are housed in a housing 13 so as to be located at respective predetermined positions. Specifically, in the case where the first LCD 11 and the second LCD 12 are located at upper and lower positions, respectively, the housing 13 is composed of an upper housing 13a and a lower housing 13b. The upper housing 13a is rotatably supported by a portion of the upper side of the lower housing 13b. The upper housing 13b having a planar shape which is somewhat larger than a planar shape of the first LCD 11 is provided with an opening so that a display screen of the first LCD 11 is exposed from one principal surface. The lower housing 13b is provided with an opening in the approximate center thereof so that a display screen of the second LCD 12 is exposed. A planar shape of the lower housing 13b is structured so as to be horizontally oriented compared to the upper housing 13a. The lower housing 13b has slits 14b, which are formed on one side of the second LCD 12, and an operation switch section 15 on either side of the second LCD 12.

The operation switch section 15 includes a direction indicator switch 15a provided on the left side of the second LCD 12 on one principal surface of the lower housing 13b, a start switch 15b, a select switch 15c, movement switches 15d and 15e provided on the right side of the second LCD 12 on one principal surface of the lower housing 13b, and side switches 15L and 15R provided on the upper surface (upper side) of the lower housing 13b. The direction indicator switch 15a is used for specifying a traveling direction of a player object (or player character), operable by a player, and a traveling direction of a cursor, for example. The movement switches 15d and 15e are used for instructing movement other than direction specification. For example, the movement switches 15d and 15e are used for inputting an instruction to jump, punch, or use a weapon, etc., in an action game, and used for inputting an instruction to acquire an item or select/determine a weapon or a command, etc., in a role playing game (RPG) and a simulation RPG. Also, if necessary, an additional movement switch may be provided.

A touch panel 16 is provided on a top surface of the second LCD 12. The touch panel 16, which may be any one of a resistive film touch panel, an optical (infrared) touch panel, and an electrostatic capacitance coupling touch panel, outputs coordinate data by detecting a location of coordinates of a stylus 17 when a depression operation or a drag operation is performed for a top surface thereof by the stylus 17 (or a finger).

A storage hole 14a for storing the stylus 17 is formed, if necessary, near the edge of the upper housing 13a. A cartridge insertion section (not shown) is formed in a portion of the side of the lower housing 13b for removably inserting a game cartridge 18 in which a memory (e.g., a ROM) storing a game program is stored. A connector (not shown) for electrical connection with the cartridge 18 is built in the cartridge insertion section. Further, an electronic circuit board (electronic circuit board 30 in FIG. 2, which will be described below) containing various electronic components such as a CPU, etc., is housed in the lower housing 13b (or upper housing 13a). Note that the information storage medium for storing a game program is not limited to a nonvolatile semiconductor memory such as a ROM or a flash memory, and may be a CD-ROM, a DVD, or an optical disk storage medium of a similar type. Note that, in the present embodiment, a game program is provided to the portable game apparatus 10 from the game cartridge 18, but it is not limited thereto. A game program may be previously installed in the portable game apparatus 10, or may be externally provided to the portable game apparatus 10 via a communication line.

Figure 2:
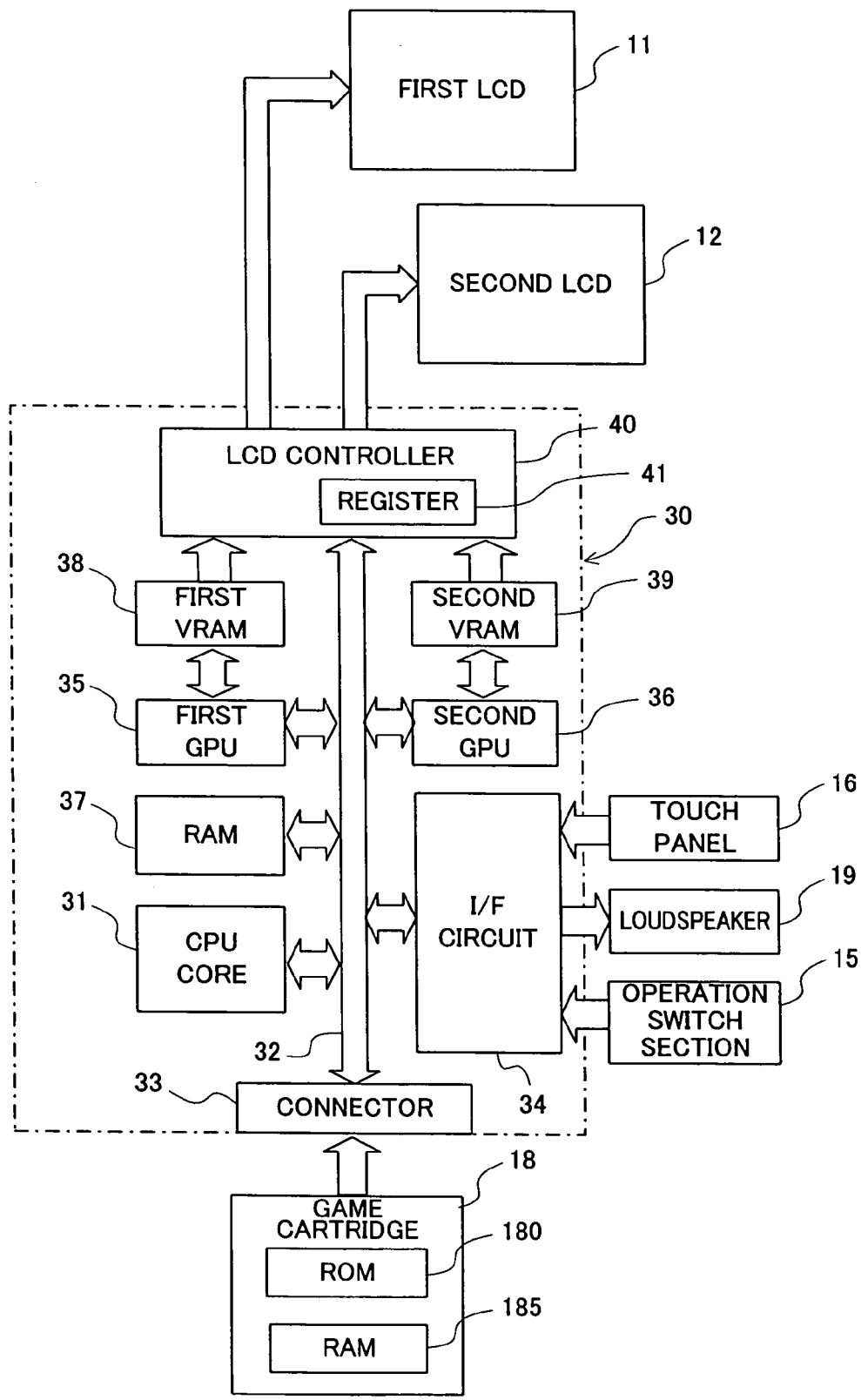
FIG. 2 is a block diagram of a portable game apparatus 10.

FIG. 2 is a block diagram of the portable game apparatus 10. In FIG. 2, a CPU core 31 is contained on the electronic circuit board 30 housed in the housing 13. Via a bus 32, a connector 33 is connected to the CPU core 31, and an input/output interface (I/F) circuit 34, a first graphic processing unit (first GPU) 35, a second graphic processing unit (second GPU) 36, a RAM 37, and an LCD controller 40 are connected to the CPU core 31. The game cartridge 18 is removably connected to the connector 33. The game cartridge 18 is a storage medium for storing a game program. Specifically, the game cartridge 18 is provided with a ROM 180 for storing a game program and a RAM 185 for rewritably storing backup data. The game program stored in the ROM 180 of the game cartridge 18 is loaded to the RAM 37, and the game program loaded to the RAM 37 is executed by the CPU core 31. Temporary data and data for image generation, which are obtained when the CPU core 31 executes the game program, are stored in the RAM 37. The operation switch section 15 and the touch panel 16 are connected to the I/F circuit 34, and a loudspeaker 19 is also connected thereto. The loudspeaker 19 is placed beneath the slits 14b.

A first video RAM (first VRAM) 38 is connected to the first GPU 35, and a second video RAM (second VRAM) 39 is connected to the second GPU 36. In accordance with an instruction from the CPU core 31, the first GPU 35 generates a first game image based on the data for image generation stored in the RAM 37, and renders (stores) the generated image in the first VRAM 38. In accordance with an instruction from the CPU core 31, the second GPU 36 generates a second game image based on the data for image generation stored in the RAM 37, and renders (stores) the generated image in the second VRAM 39. The first VRAM 38 and the second VRAM 39 are connected to the LCD controller 40.

The LCD controller 40 includes a register 41. In accordance with an instruction from the CPU core 31, the register 41 stores a value "0" or "1". When the value stored in the register 41 is "0", the LCD controller 40 outputs the game image rendered in the first VRAM 38 to the first LCD 11, and outputs the game image rendered in the second VRAM 39 to the second LCD 12. Also, when the value stored in the register 41 is "1", the LCD controller 40 outputs the game image rendered in the first VRAM 38 to the second LCD 12, and outputs the game image rendered in the second VRAM 39 to the first LCD 11.

The I/F circuit 34 is a circuit through which data is passed between external input/output devices such as the operation switch section 15, the touch panel 16, and the loudspeaker 19 and the CPU core 31. The touch panel 16 (including a device driver for a touch panel) has a coordinate system corresponding to a coordinate system of the second VRAM 39, and outputs data on position coordinates corresponding to a position input (instructed) by the stylus 17. Note that, in the present example, assume that a resolution of a display screen of the second LCD 12 is 256 dot×192 dot, and the detection accuracy of the touch panel 16 is corresponding 256 dot×192 dot. However, the detection accuracy of the touch panel 16 may be lower or higher than the resolution of the display screen of the second LCD 12.

Figure 3:
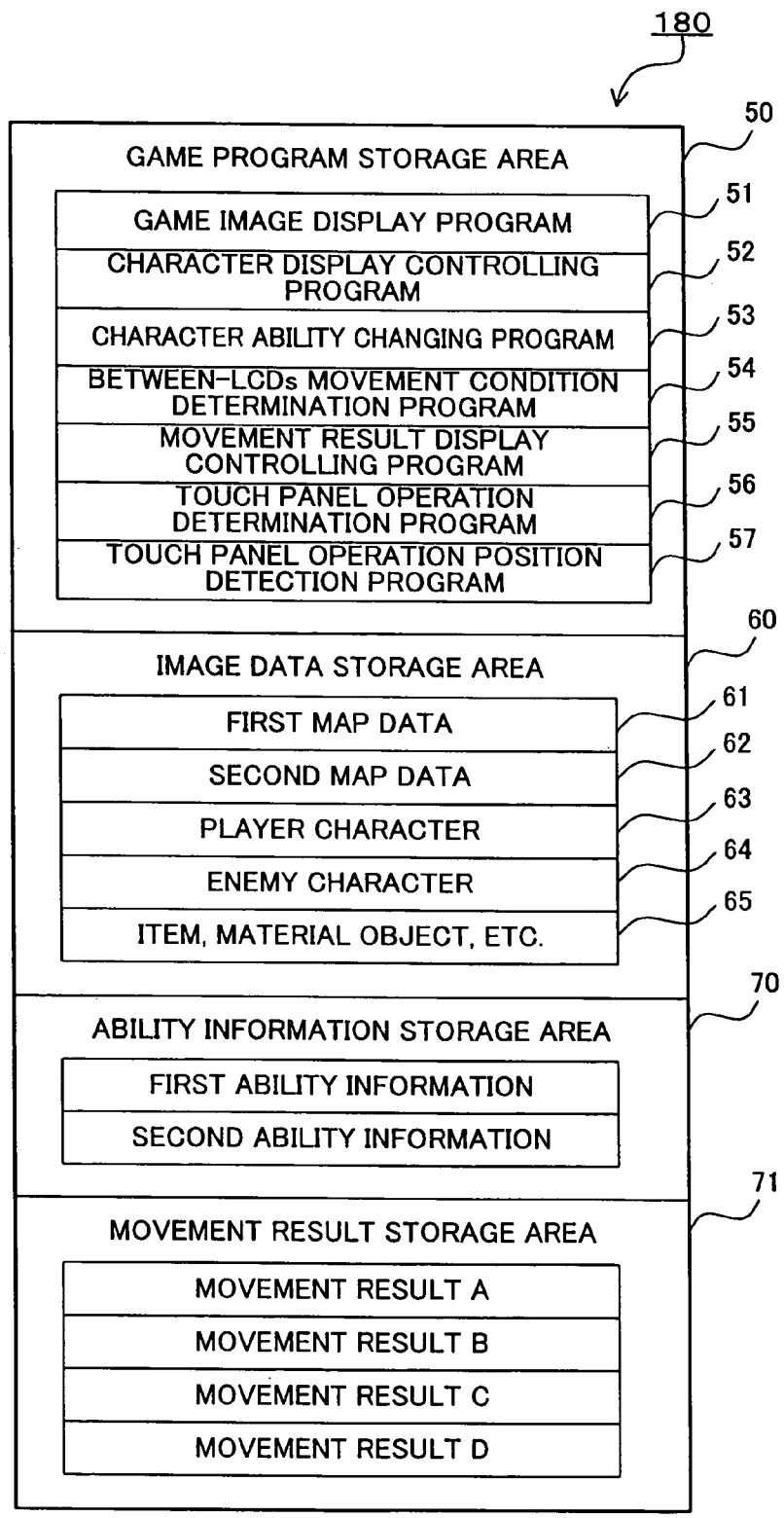
FIG. 3 is a memory map of a ROM 180.

FIG. 3 is a memory map of the ROM 180 in the game cartridge 18. The ROM 180 includes a game program storage area 50, an image data storage area 60, an ability information storage area 70, and a movement result storage area 71. The program and data stored in the ROM 180 are appropriately loaded to the RAM 37 of the portable game apparatus 10, and the program loaded to the RAM 37 is executed by the CPU core 31.

In the game program storage area 50 of the ROM 180, various programs for executing a game, which will be described below, are stored. More specifically, in the game program storage area 50, a game image display program 51, a character display controlling program 52, a character ability changing program 53, a between-LCDs movement condition determination program 54, a movement result display controlling program 55, a touch panel operation determination program 56, and a touch panel operation position detection program 57 are stored.

The game image display program 51 displays a game image on the first LCD 11 and the second LCD 12 of the portable game apparatus 10. The character display controlling program 52 displays a character operated by a player on either or both of the first LCD 11 and the second LCD 12. The character ability changing program 53 changes the ability of the character depending on whether the character is displayed on the first LCD 11 or the second LCD 12. The between-LCDs movement condition determination program 54 determines whether or not the character satisfies any condition (see FIG. 20) based on which the character can move between the first LCD 11 and the second LCD 12. The movement result display controlling program 55 displays an image representing a movement result of a specific operation performed by the player for the character on the first LCD 11 and/or the second LCD 12. The touch panel operation determination program 56 determines whether or not the player performs a specific operation with the touch panel 16 (e.g., whether or not there is an input from the touch panel 16 during a predetermined time period). The touch panel operation position detection program 57 detects a position of a touch when the touch panel 16 is touched by the stylus 17 or a finger.

In the image data storage area 60, image data for generating a game image to be displayed on the first LCD 11 and the second LCD 12 is stored. More specifically, in the image data storage area 60, first map data 61, second map data 62, player character image data 63, enemy character image data 64, and item/material object image data 65 are stored.

The first map data 61 is image data for generating a background of a game image to be displayed on the first LCD 11. The second map data 62 is image data for generating a background of a game image to be displayed on the second LCD 12. The player character image data 63 is image data representing the player character operated by the player. The enemy character image data 64 is image data representing an enemy character appearing in the game. The item/material object image data 65 is image data representing an item (e.g., a stick) and other material objects (e.g., a bank and a block) appearing in the game.

In the ability information storage area 70, first ability information and second ability information indicating the ability of the player character are stored. The ability indicated by the first ability information is different from the ability indicated by the second ability information. Specific examples of the first ability information and the second ability information will be described below (FIGS. 9, 11, 14, and 16).

In the movement result storage area 71, data indicating how the game image displayed on the first LCD 11 and/or the second LCD 12 is influenced by a specific movement of the player character based on a specific operation by the player is stored. More specifically, an influence of a specific movement of the player character displayed on the first LCD 11 on the game image displayed on the first LCD 11 is stored as a movement result A. An influence of a specific movement of the player character displayed on the first LCD 11 on the game image displayed on the second LCD 12 is stored as a movement result B. An influence of a specific movement of the player character displayed on the second LCD 12 on the game image displayed on the second LCD 12 is stored as a movement result C. An influence of a specific movement of the player character displayed on the second LCD 12 on the game image displayed on the first LCD 11 is stored as a movement result D. Specific examples of the movement results A-D will be described below (FIGS. 9, 11, 14, and 16).

Next, with reference to the flowcharts as shown in FIGS. 4-8, a process flow of the CPU core 31 executing the game will be described.

Figure 4:
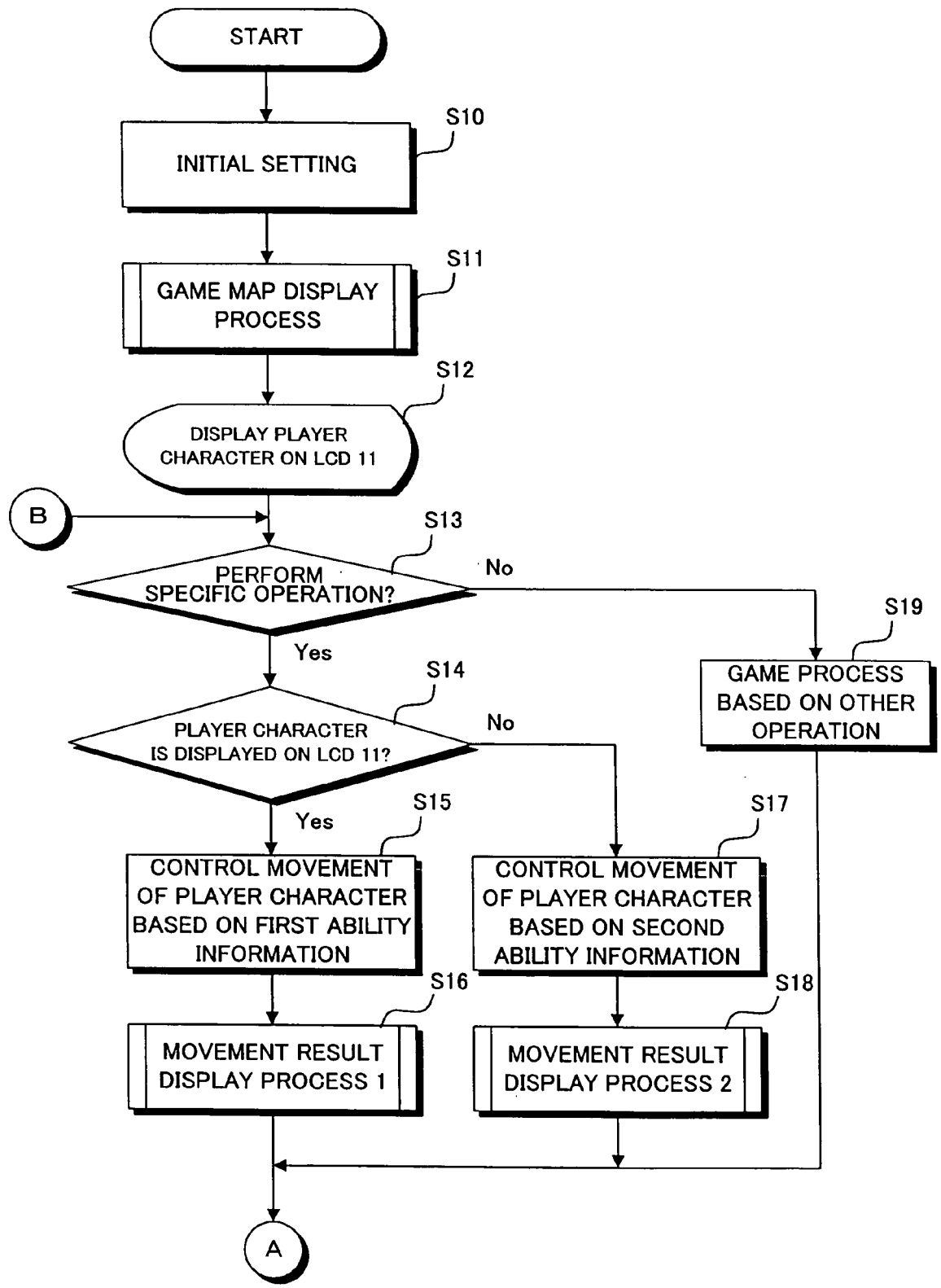
FIG. 4 is a portion of a flowchart showing a game process.

In FIG. 4, after initial setting (S10), the CPU core 31 executes a game map display process for the first LCD 11 and the second LCD 12 (S11). Hereinafter, with reference to FIG. 6, the details of the game map display process will be described.

Figure 6:
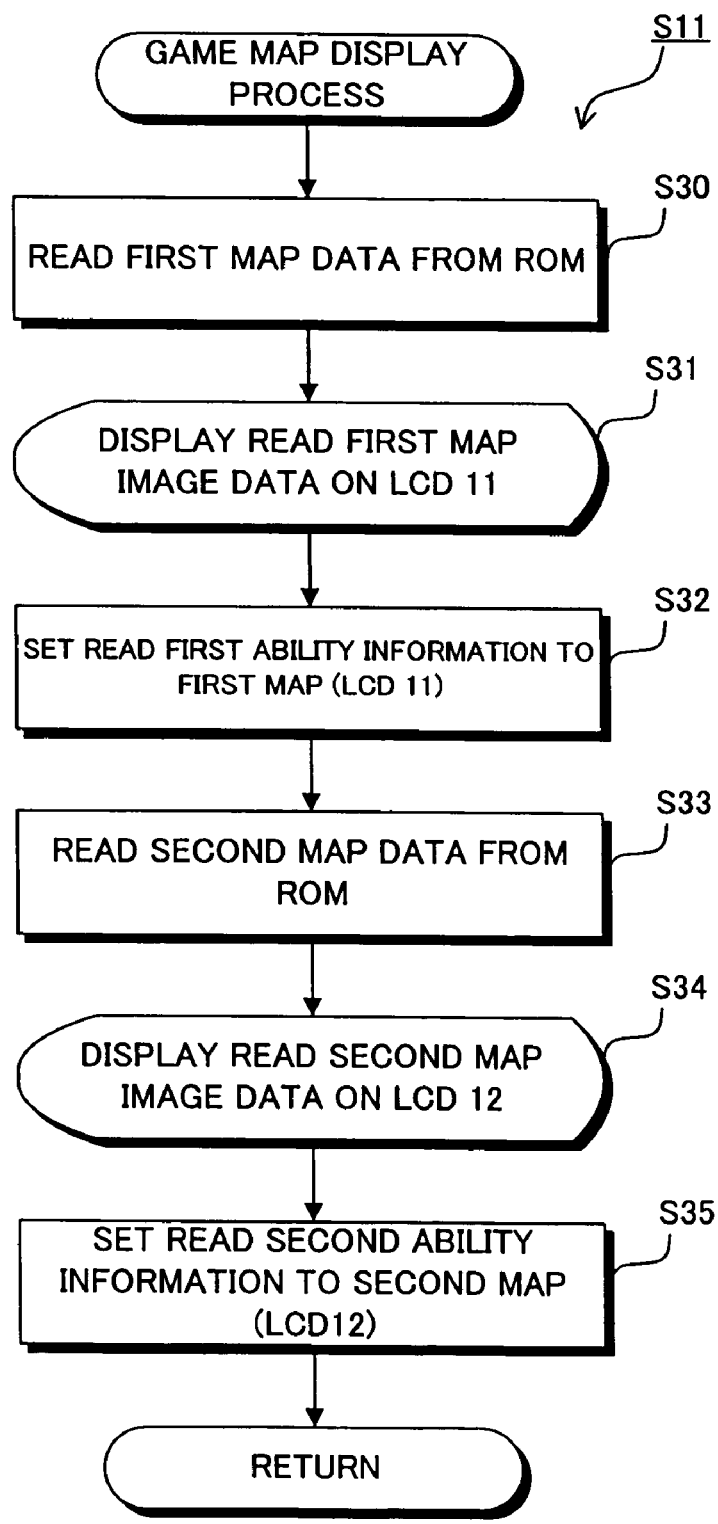
FIG. 6 is a flowchart showing the details of a game map display process.

In FIG. 6, from the ROM 180 of the game cartridge 18, the CPU core 31 reads the first map data 61 and the first ability information, which is stored in the ability information storage area 70 (S30). Then, based on the read first map data 61, the CPU core 31 displays a game image (first map) on the first LCD 11 (S31). Further, the CPU core 31 sets the read first ability information in conjunction with the first map (or first LCD 11) (S32). Specifically, the CPU core 31 writes the read first ability information to a predetermined first map-related area in the RAM 37. Also, the CPU core 31 reads, from the ROM 180 of the game cartridge 18, the second map data 62 and the second ability information, which is stored in the ability information storage area 70 (S33). Then, based on the read second map data 62, the CPU core 31 displays a game image (second map) on the second LCD 12 (S34). Further, the CPU core 31 sets the read second ability information in conjunction with the second map (or second LCD 12) (S35). Specifically, the CPU core 31 writes the read second ability information to a predetermined second map-related area in the RAM 37.

In FIG. 4, when the game map display process at step S11 is ended, the CPU core 31 reads the player character image data 63 from the ROM 180 of the game cartridge 18, and displays the player character on the first LCD 11 (S12). FIG. 10A is an exemplary screen currently displayed on the first LCD 11 and the second LCD 12. In FIG. 10A, a player character 80 is displayed on the first LCD 11.

Next, the CPU core 31 determines whether or not a specific operation (e.g., an operation to make the player character 80 jump) is performed by the player, that is, an instruction to cause the player character 80 to make a specific movement (e.g., jump) is input with the operation switch section 15 (S13). In the case where the specific operation is performed, the CPU core 31 proceeds to step S14. On the other hand, in the case where an operation other than the specific operation (e.g., a pause within the game) is performed, the CPU core 31 proceeds to step S19. At step S19, a game process based on the operation other than the specific operation is performed.

At step S14, the CPU core 31 determines whether or not the player character 80 is displayed on the first LCD 11. The above determination is made by referring to a flag, for example, indicating whether or not the player character 80 is displayed on the first LCD 11. The above flag is set when the player character 80 is displayed on the first LCD 11 for the first time, or moves to the first LCD 11 from the second LCD 12 (i.e., when a transition is made from a state in which the player character 80 is displayed on the second LCD 12 to a state in which the player character 80 is displayed on the first LCD 11), and is reset when the player character 80 moves to the second LCD 12 from the first LCD 11.

Figure 7:
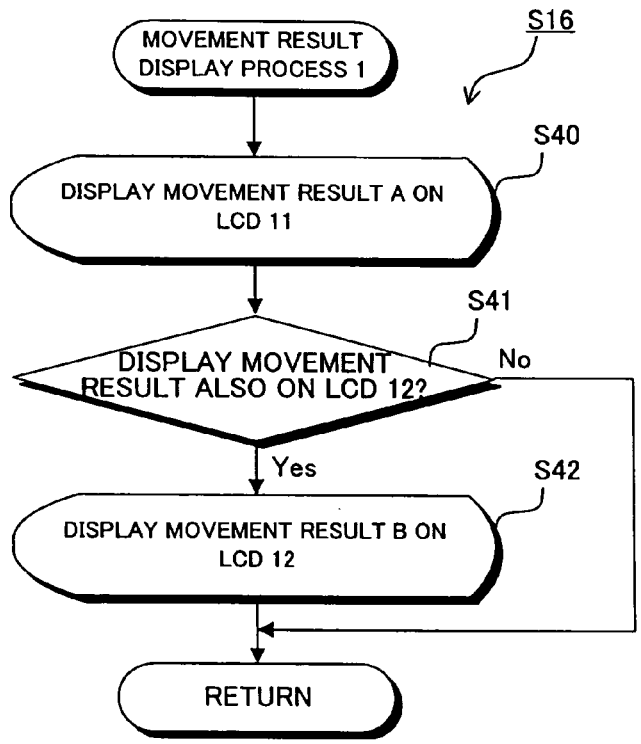
FIG. 7 is a flowchart showing the details of a movement result display process 1.

At step S14, in the case where it is determined that the player character 80 is displayed on the first LCD 11, the CPU core 31 causes the player character 80 to move based on the first ability information written to the first map-related area in the RAM 37 (S15). Then, the CPU core 31 executes a movement result display process 1 for reflecting a result of the movement in the game image on the first LCD 11 and/or the second LCD 12 (S16). Hereinafter, with reference to FIG. 7, the details of the above movement result display process 1 will be described. In FIG. 7, the CPU core 31 displays a movement result A on the first LCD 11 (that is, displays a game image in which the movement result A is reflected is displayed on the first LCD 11) (S40). Then, the CPU core 31 determines whether or not a movement result should also be displayed on the second LCD 12 (S41). Specifically, the above determination is made by checking the presence of a movement result B corresponding to the specific operation performed at step S13 of FIG. 4. In the case where it is determined that a movement result should also be displayed on the second LCD 12, the CPU core 31 displays the movement result B on the second LCD 12 (S42).

Figure 8:
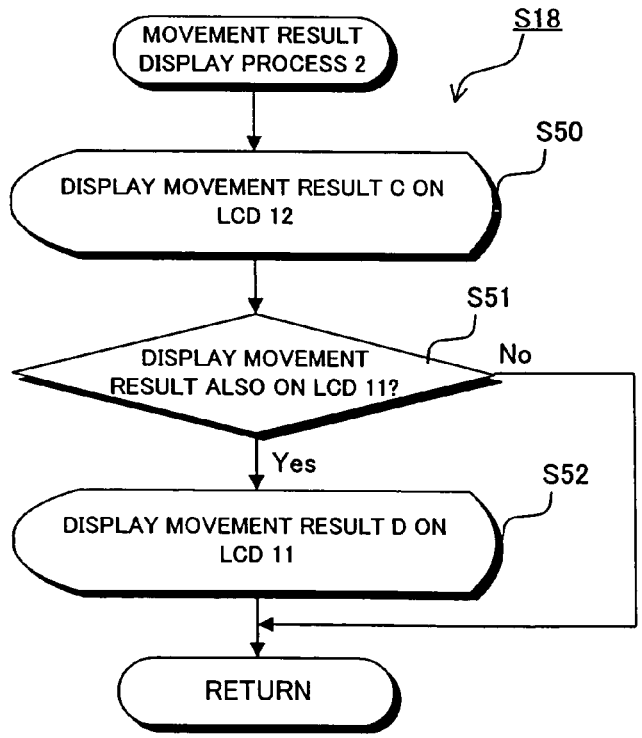
FIG. 8 is a flowchart showing the details of a movement result display process 2.

At step S14, in the case where it is determined that the player character 80 is not displayed on the first LCD 11 (that is, the player character 80 is displayed on the second LCD 12), the CPU core 31 causes the player character 80 to move based on the second ability information written to the second map-related area in the RAM 37 (S17). Then, the CPU core 31 executes a movement result display process 2 for reflecting a result of the movement in the game image on the first LCD 11 and/or the second LCD 12 (S18). Hereinafter, with reference to FIG. 8, the details of the above movement result display process 2 will be described. In FIG. 8, the CPU core 31 displays a movement result C on the second LCD 12 (that is, displays a game image in which the movement result C is reflected is displayed on the second LCD 12) (S50). Then, the CPU core 31 determines whether or not a movement result should also be displayed on the first LCD 11 (S51). Specifically, the above determination is made by checking the presence of a movement result D corresponding to the specific operation performed at step S13 of FIG. 4. In the case where it is determined that a movement result should also be displayed on the first LCD 11, the CPU core 31 displays the movement result D on the first LCD 11 (S52).

Figure 5:
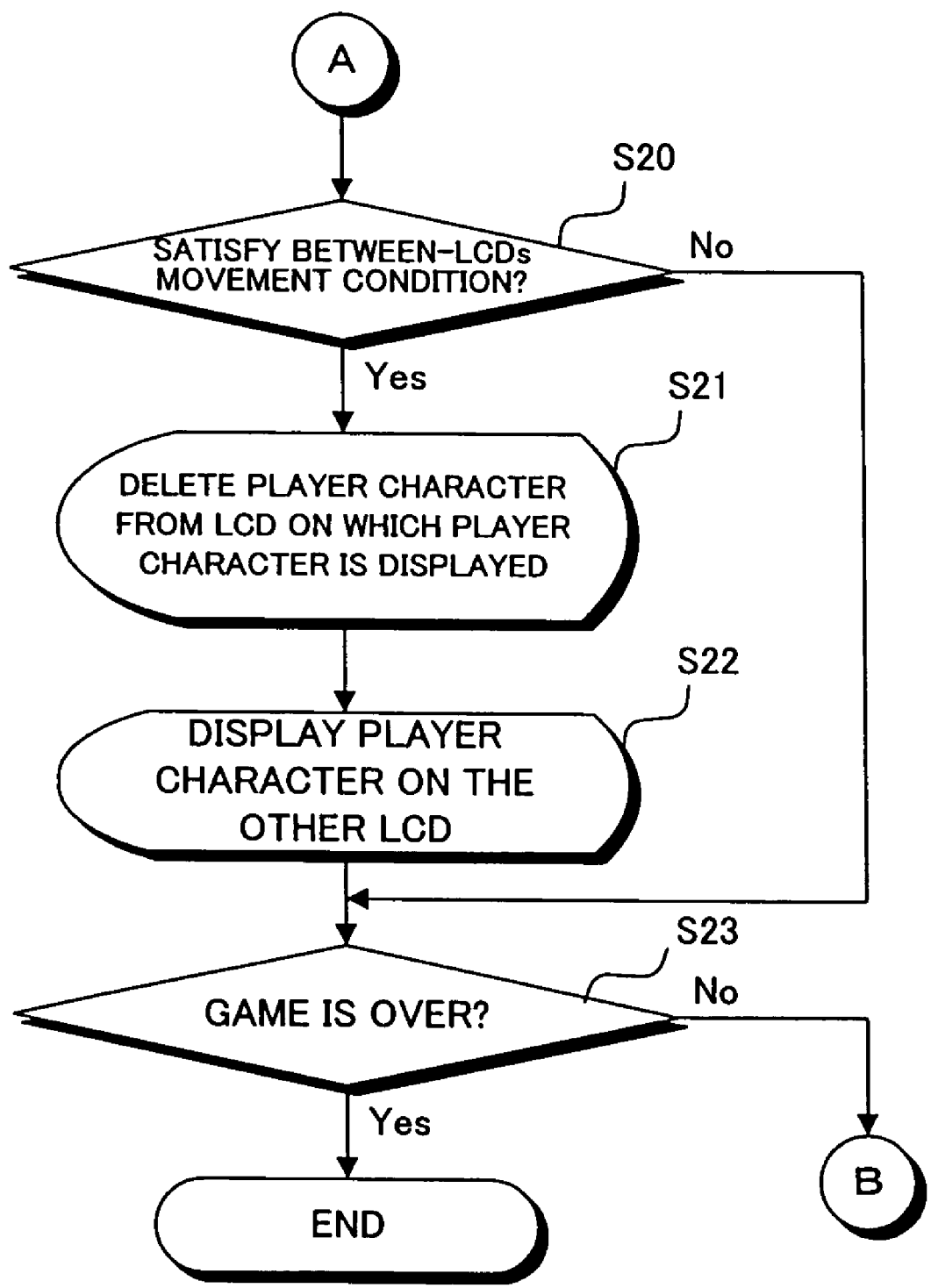
FIG. 5 is another portion of the flowchart showing the game process.

When step S16, step S18 or step S19 of FIG. 4 is ended, the CPU core 31 determines whether or not a between-LCDs movement condition is satisfied at step S20 of FIG. 5. Based on the between-LCDs movement condition, the player character 80 moves between the first LCD 11 and the second LCD 12. Specific examples of the between-LCDs movement condition will be described below (FIG. 20).

In the case where the between-LCDs movement condition is satisfied, the CPU core 31 deletes the player character 80 from the LCD on which the player character 80 is currently displayed (S21), and displays the player character 80 on the other LCD (S22). As a result, the player character 80 moves between the LCDs.

Next, the CPU core 31 determines at step S23 whether or not the game is ended. In the case where the game is ended, the CPU core 31 terminates the game process. On the other hand, in the case where the game continues, the CPU core 31 goes back to step S13 of FIG. 4.

Hereinafter, a game example realized by the present embodiment will be described.

Game Example 1

FIG. 9 shows an outline of a game example 1, a specific operation, first ability information, second ability information, and movement results A-D. Also, in FIG. 10, an exemplary game screen of the game example 1 is shown.

The game example 1 is a game in which the player character 80 strives to reach a goal point, overcoming a wall and passing through a place of extreme cold on the game map. The player can move the player character 80 from side to side by operating the direction indicator switch 15a, and cause the player character 80 to jump by operating the movement switch 15d. In the game example 1, a game map 1 displayed on the first LCD 11 is identical to a game map 2 displayed on the second LCD 12. Thus, the game images displayed on the first LCD 11 and the second LCD 12 are identical except the player character 80. The player character 80 strives to reach the goal point by appropriately moving between the game map 1 and the game map 2.

In the game example 1, two specific operations "jump" and "enter a place of extreme cold" are set as specific operations pertinent to step S13 of FIG. 4. As a parameter pertinent to the place of extreme cold, "the degree of coldness" is set. Assume that, in this example, the degree of coldness of the place of extreme cold is set to 50.

As the ability of the player character 80, the first ability information and the second ability information are set. The first ability information indicates the ability of the player character 80 when the player character 80 is displayed on the first LCD 11. Here, as the first ability information, "jumping ability" is set to 5, "cold resistance value" is set to 80, and "physical strength" is set to 50. On the other hand, the second ability information indicates the ability of the player character 80 when the player character 80 is displayed on the second LCD 12. Here, as the second ability information, "jumping ability" is set to 10, "cold resistance value" is set to 20, and "physical strength" is set to 50. Here, "cold resistance value" is a parameter indicating the cold resistance of the player character 80. When the player character 80 is in a place of extreme cold, "physical strength" is decremented by a value obtained by subtracting "the degree of coldness" from "cold resistance value" at regular time intervals. That is, while the player character 80 is displayed on the first LCD 11, the "cold resistance value" of the player character 80 exceeds "the degree of coldness" of the place of extreme cold. Thus, even if the player character 80 is in the place of extreme cold, the "physical strength" is not reduced. However, while the player character 80 is displayed on the second LCD 12, the "physical strength" is decremented by a value obtained by subtracting the "cold resistance value" of the player character 80 from "the degree of coldness" of the place of extreme cold (i.e., 30) at regular time intervals. When the "physical strength" of the player character 80 is reduced to zero, the game is over.

Note that, as the movement result, the movement result A and the movement result C are set. As stated above, the movement result A is displayed on the first LCD 11 in response to a specific operation while the player character 80 is displayed on the first LCD 11, and the movement result C is displayed on the second LCD 12 in response to a specific operation while the player character 80 is displayed on the second LCD 12. In the game example 1, as the movement result A, a movement result "fail to overcome the wall" corresponding to a specific operation "jump" and a movement result "physical strength is not reduced" corresponding to a specific operation "enter a place of extreme cold" are set. Also, as the movement result C, a movement result "succeed in overcoming the wall" corresponding to a specific operation "jump" and a movement result "physical strength is decremented by 30 at regular time intervals" corresponding to a specific operation "enter a place of extreme cold" are set.

Hereinafter, with reference to the exemplary game screens as shown in FIGS. 10A and 10B, how the game progresses will be described specifically.

As shown in FIG. 10A, if the player depresses the movement switch 15d while the player character 80 is displayed on the first LCD 11, the player character 80 jumps in accordance with the first ability information ("jumping ability" 5). Then, a game image in which the movement result A ("fail to overcome the wall") is reflected is displayed on the first LCD 11. That is, the player character 80 is unable to jump high enough to overcome the wall due to the insufficient jump ability set in the first ability information. Here, the game image of the second LCD 12 does not change because the movement result B is not set.

On the other hand, as shown in FIG. 10B, if the player depresses the movement switch 15d while the player character 80 is displayed on the second LCD 12, the player character 80 jumps in accordance with the second ability information ("jumping ability" 10). That is, the player character 80 is able to jump high enough to overcome the wall due to the sufficiently high jumping ability set in the second ability information. Then, a game image in which the movement result C ("succeed in overcoming the wall") is reflected is displayed on the second LCD 12. Here, the game image of the first LCD 11 does not change because the movement result D is not set. Note that, when the player character 80 overcomes the wall in a state of FIG. 10B, the player character 80 enters a place of extreme cold (a place indicated as "cold" in the drawing). In this case, the player character 80 may move in accordance with the second ability information. For example, the player character 80 may shiver in accordance with a difference between "cold resistance value" and "the degree of coldness" of the place of extreme cold. As a result of the movement (entering the place of extreme cold) of the player character 80, a game image in which the movement result C ("physical strength is decremented by 30 at regular time intervals") is displayed on the second LCD 12. For example, a numeric character "−30" is displayed over the head of the player character 80 at regular time intervals.

Note that, in the case where the player character 80 enters the place of extreme cold while the player character 80 is displayed on the first LCD 11, a game image in which the movement result A ("physical strength is not reduced") is reflected is displayed on the first LCD 11. For example, a numeric character "0" is displayed over the head of the player character 80 at regular time intervals.

As described above, in the game example 1, the player character 80 can reach the goal point by overcoming a high wall, if necessary, while the player character 80 is displayed on the second LCD 12, and by passing through a place of extreme cold, if necessary, preferably while the player character 80 is displayed on the first LCD 11. Thus, it is necessary for the player to guide the player character 80 to the goal point in view of, for example, the structure of a game map and a time point at which the player character 80 moves between the first LCD 11 and the second LCD 12. As such, according to the present embodiment, it is possible to realize a more novel and interesting game.

Game Example 2

FIG. 11 shows an outline of a game example 2, a specific operation, first ability information, second ability information, and movement results A-D. Also, FIG. 13 shows exemplary game screens of the game example 2.

The game example 2 is a game in which the player character 80 strives to reach a goal point by using a block as a foothold while repeating generation and destruction of blocks. The player can move the player character 80 from side to side by operating the direction indicator switch 15a, and cause the player character 80 to swing as word by operating the movement switch 15d. In the game example 2, a game map 1 displayed on the first LCD 11 is identical to a game map 2 displayed on the second LCD 12. Thus, except the player character 80, the game images displayed on the first LCD 11 and the second LCD 12 are identical, including an enemy character. The player character 80 strives to reach the goal point by appropriately moving between the game map 1 and the game map 2.

In the game example 2, "swing a sword" is set as a specific operation pertinent to step S13 of FIG. 4.

As the ability of the player character 80, first ability information and second ability information are set. The first ability information indicates the ability of the player character 80 when the player character 80 is displayed on the first LCD 11. Here, "capable of destroying a block" and "capable of attacking an enemy" are set as the first ability information. On the other hand, the second ability information indicates the ability of the player character 80 when the player character 80 is displayed on the second LCD 12. Here, "capable of generating a block" and "two blocks can be displayed (generated) in the screen" are set as the second ability information. FIG. 12 is an illustration showing a relation between the specific operation and the first ability information, and a relation between the specific operation and the second ability information.

Note that, as the movement result, the movement results A-D are set. As described above, the movement result A is displayed on the first LCD 11 in response to the specific operation while the player character 80 is displayed on the first LCD 11. The movement result B is displayed on the first LCD 12 in response to the specific operation while the player character 80 is displayed on the first LCD 11. The movement result C is displayed on the first LCD 12 in response to the specific operation while the player character 80 is displayed on the first LCD 12. The movement result D is displayed on the first LCD 11 in response to the specific operation while the player character 80 is displayed on the first LCD 12. In the game example 2, as the movement result A, "destroy any block if the block is located at a position at which the sword is swung" and "attack any enemy if the enemy is located at a position at which the sword is swung" are set. Also, the movement result B is identical to the movement result A. Further, as the movement result C, "generate a block at a position at which the sword is swung" and "not generate any block with a swing of the sword if two blocks are displayed" are set. Also, the movement result D is identical to the movement result C.

Hereinafter, with reference to the exemplary game screens as shown in FIGS. 13A-13D, how the game progresses will be described specifically.

As shown in FIG. 13A, when the player character 80 is displayed on the first LCD 11, the player character 80 is unable to generate a block with a swing of the sword. Thus, the player character 80 cannot reach the goal point (G) in the upper right corner of the screen. After that, if the player depresses the movement switch 15d after the player character 80 moves from the first LCD 11 to the second LCD 12 at a given timing, the player character 80 swings the sword as shown in FIG. 13B. In this case, assume that the player character 80 swings the sword twice. As a result, a game image in which the movement result C ("generate a block at a position at which the sword is swung") is reflected is displayed on the second LCD 12, and a game image in which the movement result D ("generate a block at a position at which the sword is swung") is reflected is displayed on the first LCD 11. That is, two blocks 81 and 82 are displayed on both the first LCD 11 and the second LCD 12. After the two blocks 81 and 82 have been generated, a new block is not generated on the second LCD 12 in accordance with the movement result C ("not generate any block with a swing of the sword if two blocks are displayed") and a new block is not generated on the first LCD 11 in accordance with the movement result D ("not generate any block with a swing of the sword if two blocks are displayed") even if the player character 80 swings the sword again.

After that, if the player depresses the movement switch 15d after the player character 80 moves from the second LCD 12 to the first LCD 11 at a given timing, the player character 80 swings the sword as shown in FIG. 13C. As a result, a game image in which the movement result A ("destroy any block if the block is located at a position at which the sword is swung") is reflected is displayed on the first LCD 11, and a game image in which the movement result B ("destroy any block if the block is located at a position at which the sword is swung") is reflected is displayed on the second LCD 12. That is, the block 82 disappears from the first LCD 11 and the second LCD 12, and the number of blocks displayed on the screen becomes one. As a result, the player character 80 is able to generate a new block on the second LCD 12.

After that, if the player moves the player character 80 to a position on the block 81 and depresses the movement switch 15d after the player character 80 moves from the first LCD 11 to the second LCD 12 at a given timing, the player character 80 swings the sword as shown in FIG. 13D. As a result, a game image in which the movement result C ("generate a block at a position at which the sword is swung") is reflected is displayed on the second LCD 12, and a game image in which the movement result D ("generate a block at a position at which the sword is swung") is reflected is displayed on the first LCD 11. That is, a block 83 is displayed on both the first LCD 11 and the second LCD 12. Thus, the player character 80 can reach the goal point by using the newly-generated block 83 as a foothold. As such, the player can guide the player character 80 to the goal point by moving the player character 80 appropriately between the first LCD 11 and the second LCD 12 so as to change a display position of a block by repeating destruction and generation of blocks while tactfully using two abilities, and moving the player character 80 by using the generated block as a foothold.

Note that, in the case where an enemy character (not shown in FIGS. 13A-13D) is present in the game map, the player character 80 can attack the enemy character while the player character 80 is displayed on the first LCD 11, whereas the player character 80 has to avoid the enemy character while the player character 80 is displayed on the second LCD 12. Thus, if the player character 80 moves between the first LCD 11 and the second LCD 12 irrespective of the intention of the player (e.g., at random intervals), the player character 80 may be suddenly put in a weaker position against the enemy character, and vice versa. As a result, the player can experience a thrilling sensation. Note that, in the present embodiment, the player can easily understand whether the player character 80 is currently capable or incapable of attacking an enemy character only by checking whether the player character 80 is displayed on the first LCD 11 or the second LCD 12.

Note that, as a variant of the game example 2, the number of generable blocks may be increased every time the player character 80 defeats a predetermined number of enemy characters. In this case, the CPU core 31 counts the number of enemy characters defeated by the player character 80, and rewrites the second ability information stored in the RAM 37 and the movement result C when the counting result reaches a predetermined value. As such, it is possible to dynamically change the ability information stored in the RAM 37 and the movement result during the game.

Game Example 3

FIG. 14 shows an outline of a game example 3, a specific operation, first ability information, second ability information, and movement results A-D. Also, FIG. 15 shows exemplary game screens of the game example 3.

The game example 3 is a game in which the player character 80 changes a direction of a river to flow over a specific point (G) by repeating generation and destruction of a bank. The player can move the player character 80 from side to side and up and down by operating the direction indicator switch 15a, and instruct a location at which a bank should be generated or destroyed by operating the movement switch 15d. In the game example 3, a game map 1 displayed on the first LCD 11 is identical to a game map 2 displayed on the second LCD 12. Thus, the game images displayed on the first LCD 11 and the second LCD 12 are identical except the player character 80. The player character 80 conducts the water to the specific point (G) by appropriately moving between the game map 1 and the game map 2.

In the game example 3, "instruct a location at which a bank should be generated (destroyed)" is set as a specific operation pertinent to step S13 of FIG. 4.

As the ability of the player character 80, the first ability information and the second ability information a reset. The first ability information indicates the ability of the player character 80 when the player character 80 is displayed on the first LCD 11. Here, "capable of destroying a bank" is set as the first ability information. On the other hand, the second ability information indicates the ability of the player character 80 when the player character 80 is displayed on the second LCD 12. Here, "capable of generating a bank" is set as the second ability information.

Note that, as the movement result, the movement results A-D are set. In the game example 3, as the movement result A, "destroy any bank at the instructed location, thereby changing the flow of the river" is set. Also, the movement result B is identical to the movement result A. Further, as the movement result C, "generate a bank at the instructed location, thereby changing the flow of the river" is set. Also, the movement result D is identical to the movement result C.

Figure 15C:
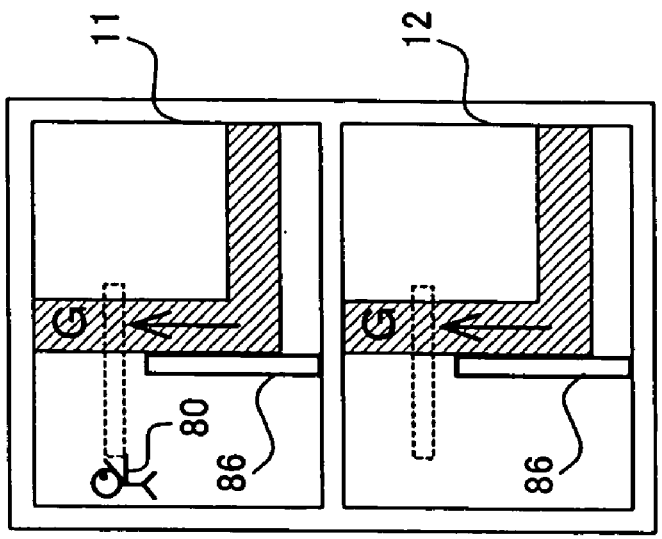
FIGS. 15A to 15C are exemplary game screens of the game example 3.
Figure 15B:
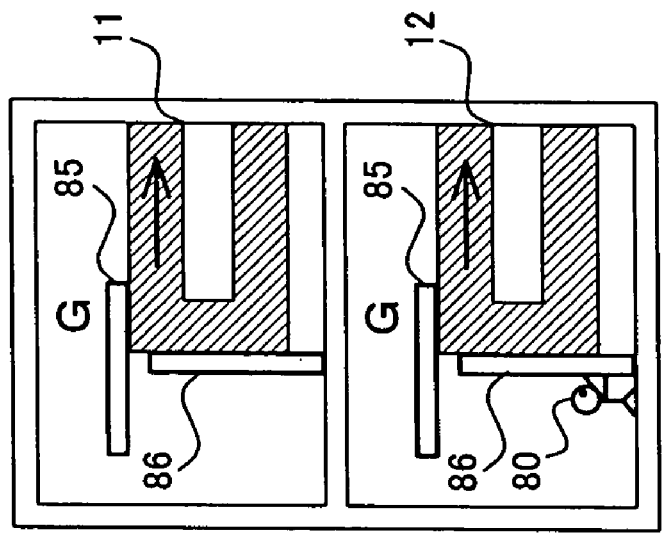
Figure 15A:
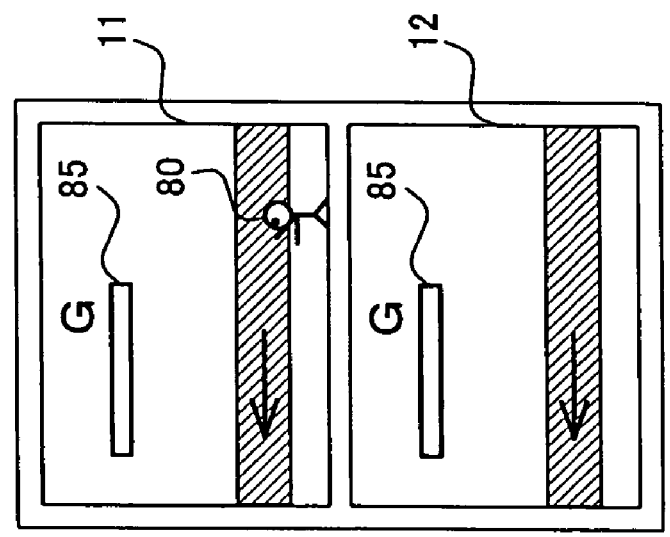

Hereinafter, with reference to the exemplary game screens as shown in FIGS. 15A-15C, how the game progresses will be described specifically.

As shown in FIG. 15A, when the player character 80 is displayed on the first LCD 11, the player character 80 is unable to generate a bank. If the player moves the player character 80 to a location as shown in FIG. 15B by operating the direction indicator switch 15a after the player character 80 moves from the first LCD 11 to the second LCD 12 at a given timing, and depresses the movement switch 15d, a game image in which the movement result C ("generate a bank at the instructed location, thereby changing the flow of the river") is reflected is displayed on the second LCD 12, and a game image in which the movement result D ("generate a bank at the instructed location, thereby changing the flow of the river") is reflected is displayed on the first LCD 11. That is, a bank 86 is displayed on both the first LCD 11 and the second LCD 12, and the flow of the river changes from FIG. 15A to FIG. 15B.

After that, if the player moves the player character 80 to a location as shown in FIG. 15C, by operating the direction indicator switch 15a after the player character 80 moves from the second LCD 12 to the first LCD 11 at a given timing, and depresses the movement switch 15d, a game image in which the movement result A ("destroy any bank at the instructed location, thereby changing the flow of the river") is reflected is displayed on the first LCD 11, and a game image in which the movement result B ("destroy any bank at the instructed location, thereby changing the flow of the river") is reflected is displayed on the second LCD 12. That is, a bank 85 disappears from both the first LCD 11 and the second LCD 12, and the flow of the river changes from FIG. 15B to FIG. 15C.

Game Example 4

FIG. 16 shows an outline of a game example 4, a specific operation, first ability information, second ability information, and movement results A-D. Also, FIG. 17 shows exemplary game screens of the game example 4.

The game example 4 is a game whose objective is acquisition of a treasure by the player character 80 by utilizing the fact that a movement result of the player character 80 in one game map has an influence on another game map. The player can move the player character 80 from side to side and up and down by operating the direction indicator switch 15a, and cause the player character 80 to punch by operating the movement switch 15d. In the game example 4, a game map 1 displayed on the first LCD 11 is different from a game map 2 displayed on the second LCD 12. Also, the game map 2 is not an extended portion of the game map 1. That is, even if the player moves the player character 80 displayed on the first LCD 11 to the lower portion thereof by operating the direction indicator switch 15a, the player character 80 does not appear from the upper portion of the second LCD 12. The player character 80 acquires the treasure by moving between the game map 1 and the game map 2.

In the game example 4, "punch" is set as a specific operation pertinent to step S13 of FIG. 4.

As the ability of the player character 80, the first ability information is set. The first ability information indicates the ability of the player character 80 when the player character 80 is displayed on the first LCD 11. Here, "capable of destroying a water tank" is set as the first ability information. In this example, the second ability information is not set.

Note that the movement results A and B are set as the movement result. In the game example 4, as the movement result A, "water in the water tank is spilled" is set. Also, as the movement result B, "fire is extinguished" is set.

Hereinafter, with reference to the exemplary game screens as shown in FIGS. 17A-17C, how the game progresses will be described specifically.

As shown in FIG. 17A, when the player character 80 is displayed on the second LCD 12, it is impossible to cause the player character 80 to acquire the treasure due to fire. After the player character 80 moves from the second LCD 12 to the first LCD 11 at a given timing, if the player causes the player character 80 to punch the water tank as shown in FIG. 17B by operating the direction indicator switch 15a and the movement switch 15d, a game image in which the movement result A ("water in the water tank is spilled") is reflected is displayed on the first LCD 11, and a game image in which the movement result B ("fire is extinguished") is reflected is displayed on the second LCD 12. That is, as shown in FIG. 17C, the water tank is broken and the water therein is spilled on the first LCD 11, whereas the fire is extinguished on the second LCD 12. Then, after the player character 80 moves from the first LCD 11 to the second LCD 12 at a given timing, the player can cause the player character 80 to acquire the treasure by operating the direction indicator switch 15a.

As described above, unlike in the game examples 1-3, in the game example 4, a movement of the player character 80 in one game map produces different results in the game map 1 and the game map 2. Thus, it is possible to realize a challenging and strategy-oriented game.

(Variant)

The touch panel 16 can be used as an input unit, although such a use of the touch panel 16 has not been specifically described in the above description. Hereinafter, as a variant of the above-described embodiment, an example in which the touch panel 16 is used as an input unit will be described. Note that this variant differs from the above embodiment only in a movement result display process 2. Therefore, the descriptions of other processes are omitted.

Figure 18:
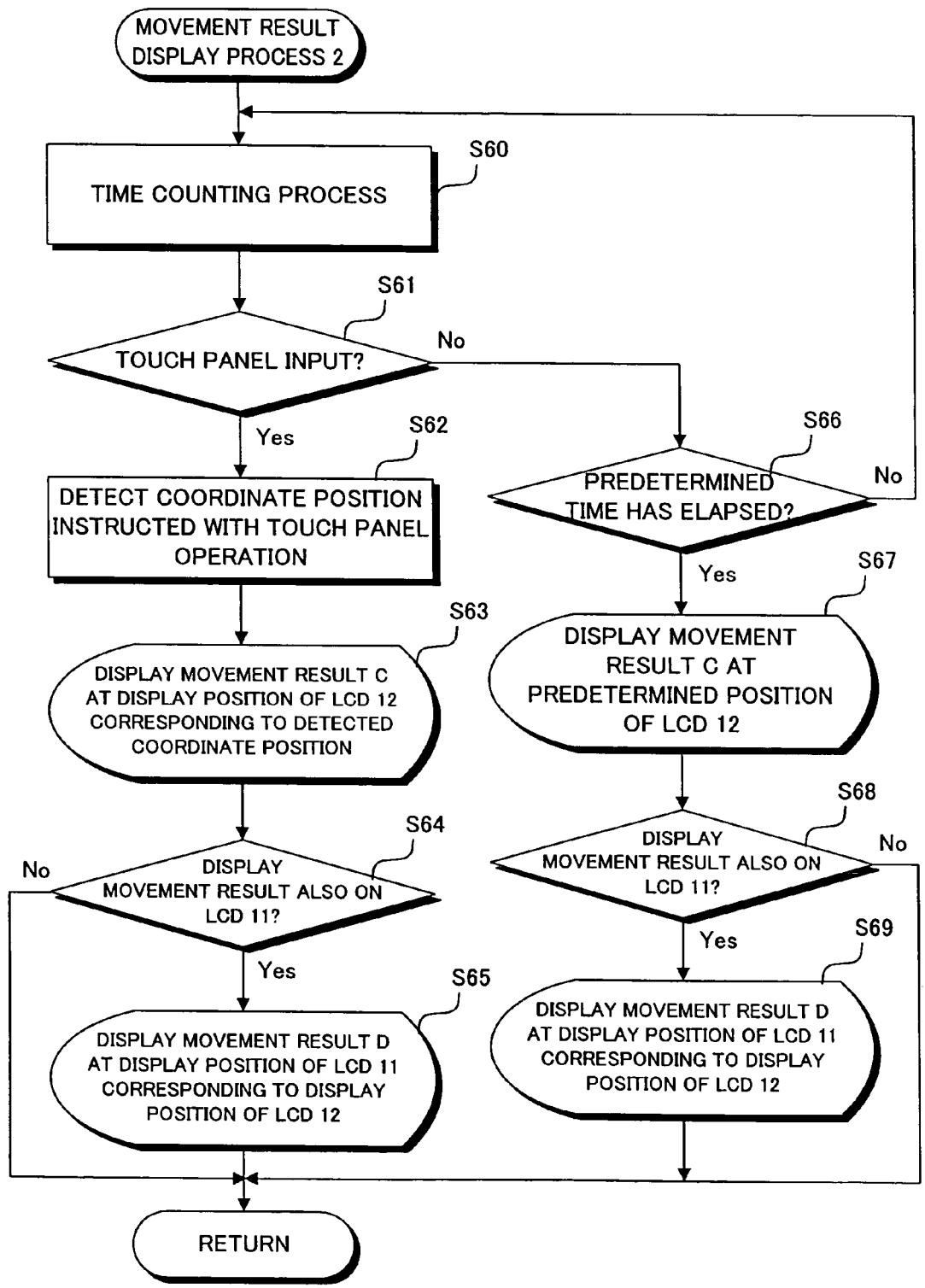
FIG. 18 is a flowchart showing the details of the movement result display process 2 according to a variant.

FIG. 18 is a flowchart showing a movement result display process 2 according to this variant. Also, FIG. 19 is an exemplary game screen according to this variant.

If it is determined at step S13 of FIG. 4 that a specific operation is performed and determined at step S14 that the player character 80 is displayed on the second LCD 12, the CPU core 31 controls a movement of the player character 80 at step 17 based on the second ability information (e.g., causes the player character 80 to swing the sword). After that, the CPU core 31 executes the movement result display process 2 as shown in FIG. 18.

In FIG. 18, the CPU core 31 first performs a time counting process (S60) by, for example, incrementing data values used for time counting. Then, the CPU core 31 determines whether or not there is an input from the touch panel 16 (S61). If it is determined that there is an input from the touch panel 16, the CPU core 31 proceeds to step S62, and otherwise proceeds to step S66. At step S66, the CPU core 31 determines whether or not a predetermined time (e.g., one second) has elapsed after the start of the movement result display process 2 (S66). If it is determined that a predetermined time has elapsed, the CPU core 31 proceeds to step S67, and otherwise goes back to step S60. As described above, in the case where there is an input from the touch panel 16 during a predetermined time elapsed after the start of the movement result display process 2, the CPU core 31 proceeds to step S62. On the other hand, in the case where there is no input from the touch panel 16 during a predetermined time elapsed after the start of the movement result display process 2, the CPU core 31 proceeds to step S67.

At step S62, the CPU core 31 detects a coordinate position on the touch panel 16 where the stylus 17 or a finger has touched. Then, the CPU core 31 displays a movement result C on the second LCD 12 at a display position corresponding to the detected coordinate position (that is, displays an image relating to the movement result C) (S63). For example, in the case where the movement result C is "generate a block", the CPU core 31 displays a block on the second LCD 12 at a display position corresponding to the coordinate position on the touch panel 16 where the stylus 17 or a finger has touched. Further, the CPU core 31 determines whether or not a movement result should be displayed on the first LCD 11 (S64). Specifically, the above determination is made by checking whether or not there is a movement result D corresponding to the specific operation performed at step S13 of FIG. 4. If it is determined that a movement result should be displayed on the first LCD 11, the CPU core 31 displays the movement result D on the first LCD 11 at a display position corresponding to the display position of the movement result C on the second LCD 12 (that is, displays an image relating to the movement result D) (S65).

On the other hand, in the case where there is no input from the touch panel 16 during a predetermined time elapsed after the start of the movement result display process 2, the CPU core 31 displays the movement result C at a predetermined position (e.g., a position at which the player character 80 swings the sword) of the second LCD 12 at step S67. Further, the CPU core 31 determines whether or not a movement result should be displayed on the first LCD 11 (S68). If it is determined that a movement result should be displayed on the first LCD 11, the CPU core 31 displays the movement result D on the first LCD 11 at a display position corresponding to the display position of the movement result C on the second LCD 12 (that is, displays an image relating to the movement result D) (S69).

Figure 19C:
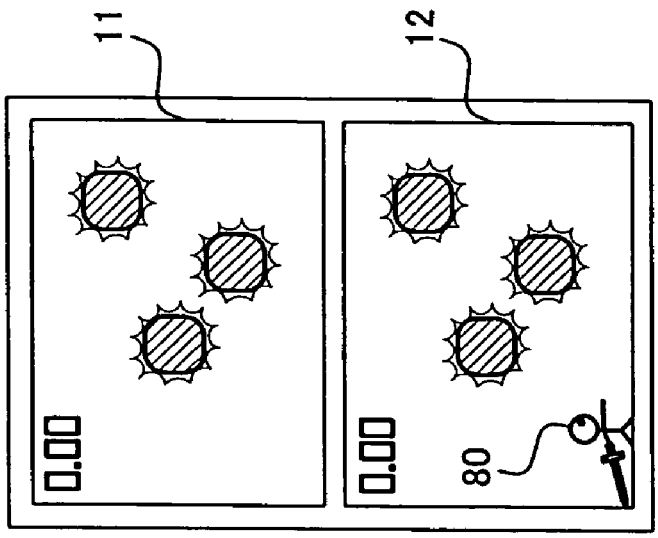
FIGS. 19A to 19C are exemplary game screens according to the variant.
Figure 19B:
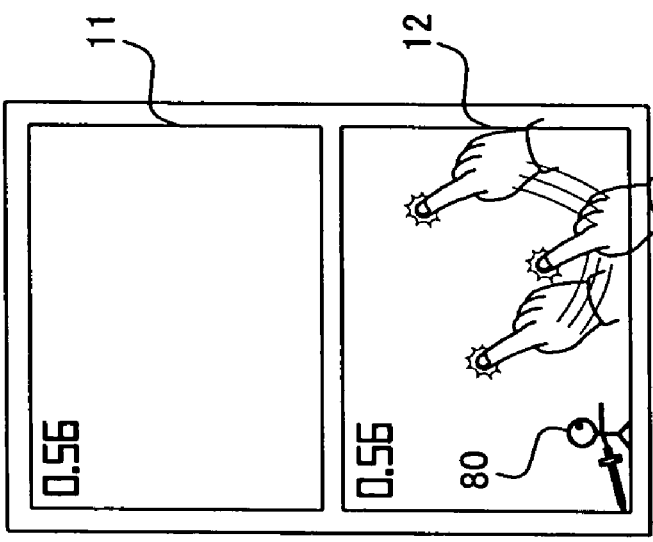
Figure 19A:
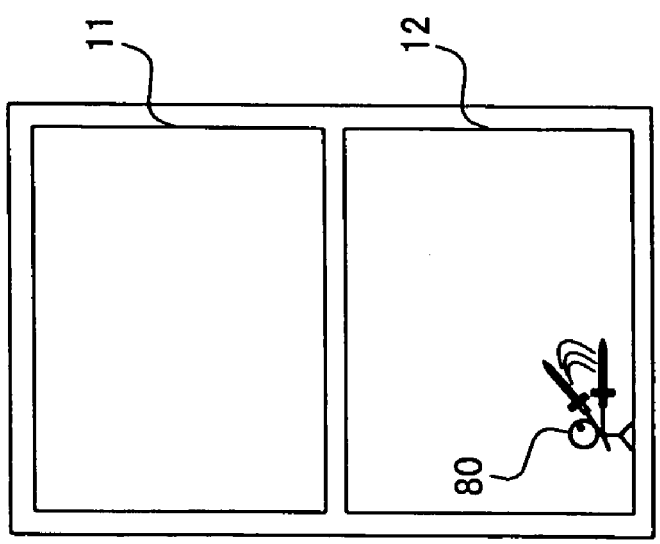

FIG. 19A is an exemplary game screen when the CPU core 31 causes the player character 80 to swing the sword. Immediately after the CPU core 31 causes the player character 80 to swing the sword, a countdown of a predetermined time (e.g., one second) is started. FIG. 19B shows a scene in which the player touches three points on the touch panel 16. On the first LCD 11 and the second LCD 12, the remaining number of seconds (in this case, 0.56 seconds) of the above-described predetermined time is displayed. As shown in FIG. 19C, when the remaining number of seconds reaches zero, blocks are displayed on the second LCD 12 at display positions corresponding to the positions where the player has touched, and blocks are displayed on the first LCD 11 at display positions corresponding to the above display positions on the second LCD 12.

As such, a position at which a movement result is displayed can be specified by the touch panel 16, whereby the player is allowed to specify a display position of the movement result in a more flexible manner.

Note that, in the above-described embodiment and variant, there may be various conditions based on which the player character 80 moves between the first LCD 11 and the second LCD 12. Hereinafter, with reference to FIG. 20, typical examples of the above conditions will be described.

Based on the first exemplary condition, the player character 80 moves between the first LCD 11 and the second LCD 12 every time a predetermined time has elapsed. In this case, as shown in FIG. 20, in order to allow the player to predict an approximate time at which the player character 80 moves from one LCD to another, it is preferable to display, on the first LCD 11 and/or the second LCD 12, a remaining time until the player character 80 moves between the first LCD 11 and the second LCD 12.

Based on the second exemplary condition, the player character 80 moves between the first LCD 11 and the second LCD 12 when the player character 80 stays a specific point in the game map for a predetermined time.

Based on the third exemplary condition, the player character 80 moves between the first LCD 11 and the second LCD 12 when the player character 80 uses a predetermined item (e.g., an stick).

Based on the fourth exemplary condition, the player character 80 moves between the first LCD 11 and the second LCD 12 when the player character 80 defeats a predetermined number of enemy characters in one game map. In this case, as shown in FIG. 20, in order to allow the player to predict an approximate time at which the player character 80 moves between the first LCD 11 and the second LCD 12, it is preferable to display a meter indicating the number of enemy characters to be defeated to satisfy the condition and the number of enemy characters defeated so far on the first LCD 11 and/or the second LCD 12.

Also, in the above-described game examples, the following two cases have been described: a first case (as shown in the game example 2 and the game example 3) in which the game map 1 is identical to the game map 2 and the movement result A is identical to the movement result B (or the movement result C is identical to the movement result D), and a second case (as shown in the game example 4) in which the game map 1 is different from the game map 2 and the movement result A is different from the movement result B. As another game example, there may be a case in which the game map 1 is identical to the game map 2 and the movement result A is different from the movement result B, or a case in which the game map 1 is different from the game map 2 and the movement result A is identical to the movement result B.

While the invention has been described in detail, the foregoing description is in all aspects illustrative and not restrictive. It is understood that numerous other modifications and variations can be devised without departing from the scope of the invention.

What is claimed is:

1. A game apparatus comprising:
   a first display section which displays a first game image;
   a second display section which displays a second game image relating to the first game image;
   a character display controller which controls display of a player character on either the first display section or the second display section;
   character ability changing programmed logic circuitry which changes an ability of the player character depending on whether the player character is displayed on the first display section or the second display section;
   an operation section operated by a player in order to operate the player character; and
   a display section detector which detects whether the player character is displayed on the first display section or the second display section, wherein
   when the display section detector detects that the player character is displayed on the first display section, a movement of the player character is controlled by the character display controller based on the first ability information in accordance with the operation of the operation section by the player, and
   when the display section detector detects that the player character is displayed on the second display section, a movement of the player character is controlled by the character display controller based on the second ability information in accordance with the operation of the operation section by the player, and wherein a same region of a same game field is displayed on each of the first display section and the second display section.

2. The game apparatus according to claim 1, further comprising movement condition determination programmed logic circuitry which determines whether or not the player character satisfies a condition based on which the player character is able to move between the first display section and the second display section, wherein when the movement condition determination programmed logic circuitry determines that the condition is satisfied, the character display controller performs display control such that the player character moves between the first display section and the second display section.

3. The game apparatus according to claim 1, wherein the character ability changing programmed logic circuitry sets first ability information indicating an ability of the player character as information associated with the first display section, and sets second ability information, which is different from the first ability information, indicating an ability of the player character as information associated with the second display section.

4. The game apparatus according to claim 1, further comprising a movement result display controller for displaying a movement result on at least one of the first display section and the second display section when a movement of the player character is controlled by the character display controller, wherein when the player performs a specific operation for the player character using the operation section, the movement result display controller displays, in response to the specific operation, different movement results depending on whether the player character is displayed on the first display section or the second display section.

5. The game apparatus according to claim 4, wherein the movement result display controller displays a first movement result on the first or second display section on which the player character is displayed, and displays a second movement result relating to the first movement result on the other display section.

6. The game apparatus according to claim 5, wherein the first movement result is identical to the second movement result.

7. The game apparatus according to claim 4, further comprising:

a touch panel provided on at least one of the first display section and the second display section;

touch panel operation determination programmed logic circuitry for determining whether or not the touch panel is operated within a predetermined time after a movement of the player character is controlled by the character display controller; and an operation position detector for detecting an operation position of the touch panel when the touch panel operation determination programmed logic circuitry determines that the touch panel is operated, wherein the movement result display controller displays a movement result at a display position of the first display section and/or the second display section corresponding to the operation position detected by the operation position detector.

8. A game apparatus comprising:

a first display section which displays a first game image;

a second display section which displays a second game image relating to the first game image;

a character display controller which controls display of a player character on either the first display section or the second display section;

an operation section operated by a player in order to move the player character;

a movement result display controller which displays a first movement result on the first or second display section on which the player character is displayed based on an operation of the operation section by the player, and displays a second movement result relating to the first movement result on the other display section; and movement condition determination programmed logic circuitry for determining whether or not the player character satisfies a condition based on which the player character is able to move between the first display section and the second display section, wherein when the movement condition determination programmed logic circuitry determines that the condition is satisfied, the character display controller performs display control such that the player character moves between the first display section and the second display section, and wherein a same region of a same game field is displayed on each of the first display section and the second display section.

9. The game apparatus according to claim 8, wherein the first movement result is different from the second movement result.

10. A computer readable recording medium recording a game program that causes a computer of a game apparatus comprising a first display section for displaying a first game image and a second display section for displaying a second game image relating to the first game image to execute:

displaying a player character on either the first display section and the second display section;

changing an ability of the player character depending on whether the player character is displayed on the first display section or the second display section, including setting first ability information indicating an ability of the player character as information associated with the first display section, and sets second ability information, which is different from the first ability information, indicating an ability of the player character as information associated with the second display section, wherein the game apparatus further comprises an operation section operated by a player in order to operate the player character, and the game program further causes the computer to execute display section detecting which detects whether the player character is displayed on the first display section or the second display section, wherein when the display section detecting detects that the player character is displayed on the first display section, character display controlling controls a movement of the player character based on the first ability information in accordance with the operation of the operation section by the player, and when the display section detecting detects that the player character is displayed on the second display section, the character display controlling controls a movement of the player character based on the second ability information in accordance with the operation of the operation section by the player, and wherein a same region of a same game field is displayed on each of the first display section and the second display section.

11. The computer readable recording medium according to claim 10, wherein the game program further causes the computer to execute determining whether or not the player character satisfies a condition based on which the player character is able to move between the first display section and the second display section, and when it is determined at the movement condition determining step that the condition is satisfied, the character display controlling step performs display control such that the player character moves between the first display section and the second display section.

12. The computer readable recording medium according to claim 10, wherein the game program further causes the computer to execute movement result display controlling which displays a movement result on at least one of the first display section and the second display section when a movement of the player character is controlled at the character display controlling, and when the player performs a specific operation for the player character using the operation section, the movement result display controlling displays, in response to the specific operation, different movement results depending on whether the player character is displayed on the first display section or the second display section.

13. The computer readable recording medium according to claim 12, wherein the movement result display controlling displays a first movement result on the first or second display section on which the player character is displayed, and displays a second movement result relating to the first movement result on the other display section.

14. A computer readable recording medium recording a game program causing a computer of a game apparatus, which comprises a first display section which displays a first game image, a second display section which displays a second game image relating to the first game image, and an operation section operated by a player in order to move a character, to execute:

displaying the player character on either the first display section or the second display section;

displaying a first movement result based on an operation of the operation section by the player on the first or second display section on which the player character is displayed, and displaying a second movement result relating to the first movement result on the other display section; and determining whether or not the player character satisfies a condition based on which the player character is able to move between the first display section and the second display section, wherein when it is determined that the condition is satisfied, character display controlling performs display control such that the player character moves between the first display section and the second display section, and wherein a same region of a same game field is displayed on each of the first display section and the second display section.

* * * * *